United States Patent
Montavon et al.

(10) Patent No.: US 11,107,491 B2
(45) Date of Patent: Aug. 31, 2021

(54) SENSOR DATA ARRAY AND METHOD OF COUNTING OCCUPANTS

(71) Applicant: CURRENT LIGHTING SOLUTIONS, LLC, East Cleveland, OH (US)

(72) Inventors: Berney L. Montavon, Mentor, OH (US); Kevin Vick, East Cleveland, OH (US); Bruce Roberts, East Cleveland, OH (US)

(73) Assignee: Current Lighting Solutions, LLC, East Cleveland, OH (US)

( * ) Notice: Subject to any disclaimer, the term of this patent is extended or adjusted under 35 U.S.C. 154(b) by 21 days.

(21) Appl. No.: 16/555,402

(22) Filed: Aug. 29, 2019

(65) Prior Publication Data

US 2020/0082840 A1    Mar. 12, 2020

Related U.S. Application Data

(60) Provisional application No. 62/727,949, filed on Sep. 6, 2018.

(51) Int. Cl.
    *G10L 21/0264*      (2013.01)
    *G06K 9/62*      (2006.01)
    (Continued)

(52) U.S. Cl.
    CPC ...... *G10L 21/0264* (2013.01); *G06K 9/00369* (2013.01); *G06K 9/00778* (2013.01); *G06K 9/6289* (2013.01); *G10L 17/00* (2013.01)

(58) Field of Classification Search
    CPC . G10L 21/0264; G10L 17/00; G06K 9/00369; G06K 9/00778; G06K 9/6289
    (Continued)

(56) References Cited

U.S. PATENT DOCUMENTS

| | | |
|---|---|---|
| 8,166,052 B2 | 4/2012 | Song et al. |
| 2012/0182427 A1 | 7/2012 | Marshall |
| (Continued) | | |

FOREIGN PATENT DOCUMENTS

CN      1066600777 A      4/2017

OTHER PUBLICATIONS

International Search Report and Written Opinion dated Dec. 20, 2019 which was issued in connection with PCT Application No. PCT/US19/049042, 10 pp.

*Primary Examiner* — Paul Kim
(74) *Attorney, Agent, or Firm* — Buckley, Maschoff & Talwalkar LLC

(57) ABSTRACT

A system and method including receiving, from a plurality of sensors, a sequence of data indicative of a presence of a person in an area of interest within a field of view of the plurality of sensors; determining an estimate of background level information for the area of interest in an instance of an absence of a person in the area of interest; generating a probability of a person being located in the area of interest based on a combination of the determined background level information and the sequence of data indicative of a presence of a person in the area of interest; determining a number of centroids in the area of interest based on an execution of clustering executed to determine an optimized total number of centroids for a dataset; and generating a count of persons in the area of interest based on determined total number of centroids.

20 Claims, 22 Drawing Sheets

(51) Int. Cl.
*G06K 9/00* (2006.01)
*G10L 17/00* (2013.01)

(58) Field of Classification Search
USPC .......................................................... 381/71.1
See application file for complete search history.

(56) References Cited

U.S. PATENT DOCUMENTS

2012/0274755 A1* 11/2012 Sinha ................. G06K 9/00369
348/77
2013/0163857 A1* 6/2013 Bronder ................ G06K 9/342
382/154

* cited by examiner

Thermal array 800

| 22.5 | 22.0 | 21.6 | 21.5 | 21.4 | 21.0 | 20.7 | 19.4 |
|---|---|---|---|---|---|---|---|
| 22.4 | 21.7 | 21.4 | 21.6 | 21.1 | 20.9 | 20.4 | 19.2 |
| 21.9 | 21.7 | 21.5 | 21.3 | 21.0 | 20.7 | 20.6 | 19.5 |
| 22.5 | 22.0 | 21.9 | 21.5 | 21.3 | 21.0 | 20.4 | 19.5 |
| 22.3 | 23.5 | 23.8 | 22.2 | 21.3 | 20.9 | 20.5 | 19.6 |
| 22.8 | 24.2 | 25.6 | 23.3 | 21.6 | 21.2 | 20.6 | 19.5 |
| 22.4 | 22.9 | 22.7 | 22.2 | 21.8 | 21.3 | 20.3 | 19.7 |
| 22.6 | 22.5 | 22.3 | 22.4 | 21.8 | 21.1 | 21.1 | 19.7 |

Thermal array 800

| 22.8 | 22.4 | 21.9 | 21.8 | 21.9 | 21.4 | 21.1 | 19.8 |
|---|---|---|---|---|---|---|---|
| 22.9 | 22.2 | 21.7 | 21.9 | 21.6 | 21.3 | 20.7 | 19.6 |
| 22.2 | 22.0 | 21.7 | 21.8 | 21.5 | 21.1 | 21.0 | 20.0 |
| 22.5 | 22.3 | 22.1 | 21.9 | 21.7 | 21.4 | 20.7 | 20.1 |
| 22.4 | 22.0 | 22.0 | 21.9 | 21.7 | 21.4 | 21.1 | 19.9 |
| 22.8 | 22.4 | 22.3 | 22.2 | 21.9 | 21.5 | 20.9 | 20.1 |
| 22.6 | 22.5 | 21.9 | 22.1 | 22.1 | 21.7 | 20.7 | 20.1 |
| 22.8 | 22.6 | 22.5 | 22.6 | 22.0 | 21.4 | 21.3 | 20.3 |

FIG. 8A

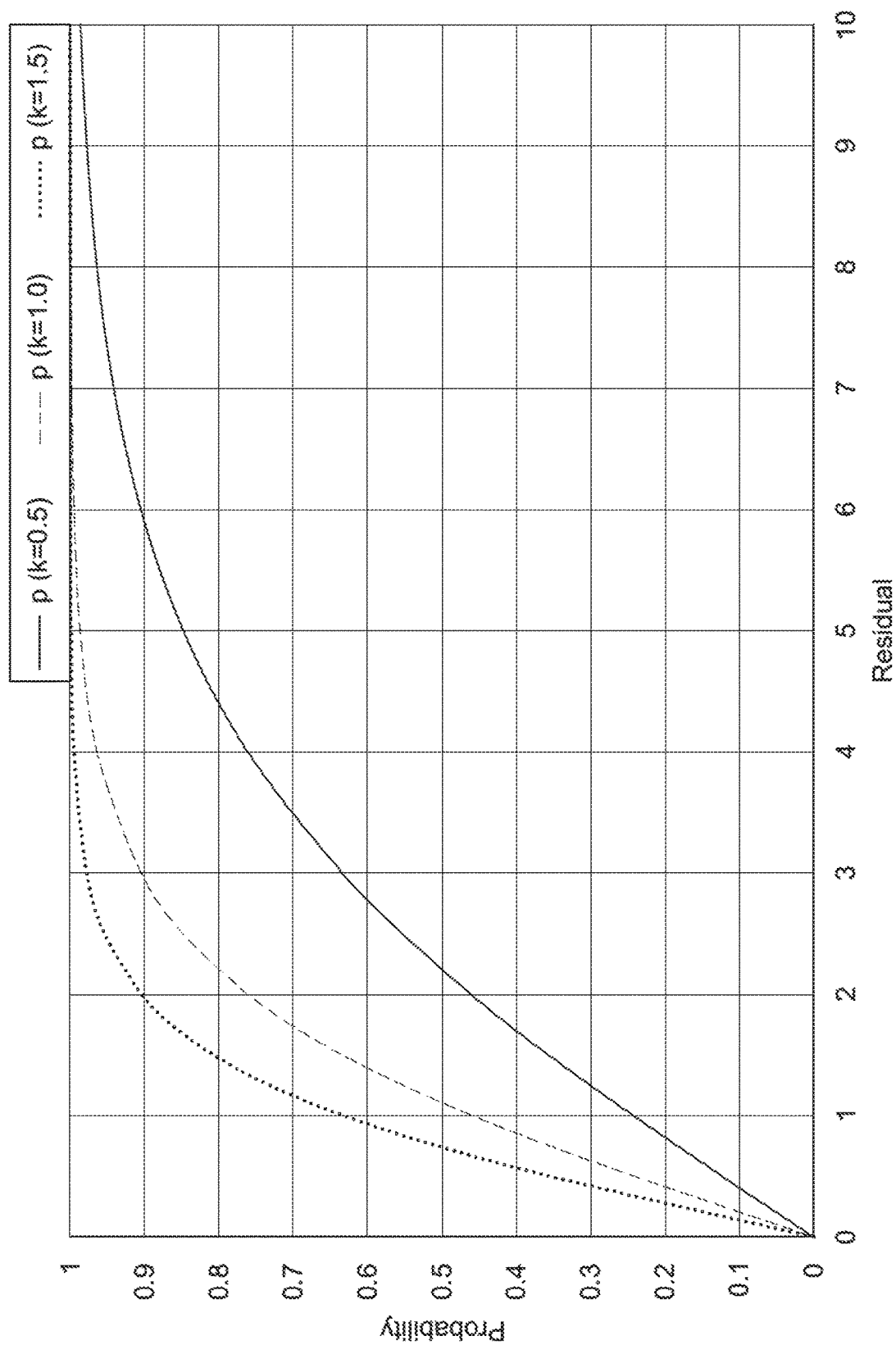

| Probability array | | | | | | | |
|---|---|---|---|---|---|---|---|
| 0% | 0% | 0% | 0% | 0% | 0% | 0% | 0% |
| 0% | 0% | 0% | 0% | 0% | 0% | 0% | 0% |
| 0% | 0% | 0% | 0% | 0% | 0% | 0% | 0% |
| 0% | 0% | 0% | 0% | 0% | 0% | 0% | 0% |
| 0% | 83% | 94% | 3% | 0% | 0% | 0% | 0% |
| 0% | 98% | 99% | 54% | 0% | 0% | 0% | 0% |
| 0% | 8% | 0% | 1% | 0% | 0% | 0% | 0% |
| 0% | 0% | 0% | 0% | 0% | 0% | 0% | 0% |

FIG. 11B

| Thermal array | | | | | | | |
|---|---|---|---|---|---|---|---|
| 22.5 | 22.0 | 21.6 | 21.5 | 21.4 | 21.0 | 20.7 | 19.4 |
| 22.4 | 21.7 | 21.4 | 21.6 | 21.1 | 20.9 | 20.4 | 19.2 |
| 21.9 | 21.7 | 21.5 | 21.3 | 21.0 | 20.7 | 20.6 | 19.5 |
| 22.5 | 22.0 | 21.9 | 21.5 | 21.3 | 21.0 | 20.4 | 19.5 |
| 22.3 | 23.5 | 23.8 | 22.2 | 21.3 | 20.9 | 20.5 | 19.6 |
| 22.8 | 24.2 | 25.6 | 23.3 | 21.6 | 21.2 | 20.6 | 19.5 |
| 22.4 | 22.9 | 22.7 | 22.2 | 21.8 | 21.3 | 20.3 | 19.7 |
| 22.6 | 22.5 | 22.3 | 22.4 | 21.8 | 21.1 | 21.1 | 19.7 |

FIG. 11A

Thermal array

| 22.8 | 22.9 | 23.2 | 23.9 | 22.4 | 21.6 | 21.3 | 20.1 |
|------|------|------|------|------|------|------|------|
| 22.8 | 23.0 | 24.1 | 25.3 | 23.2 | 21.8 | 20.6 | 20.1 |
| 23.2 | 22.9 | 23.2 | 25.5 | 24.2 | 21.7 | 20.9 | 19.9 |
| 22.4 | 22.0 | 22.3 | 23.2 | 22.4 | 21.4 | 21.0 | 20.0 |
| 22.4 | 22.2 | 22.1 | 22.0 | 21.6 | 21.8 | 21.0 | 20.2 |
| 22.0 | 22.0 | 21.7 | 21.6 | 21.3 | 21.6 | 23.8 | 22.4 |
| 22.7 | 22.0 | 21.5 | 21.8 | 21.6 | 22.0 | 23.1 | 22.4 |
| 22.7 | 22.2 | 21.8 | 21.6 | 21.7 | 21.5 | 21.6 | 20.7 |

FIG. 12A

Probability array

| 0% | 0% | 23% | 81% | 8% | 2% | 0% | 0% |
|----|----|-----|-----|----|----|----|----|
| 0% | 7% | 58% | 99% | 63% | 1% | 0% | 0% |
| 2% | 10% | 52% | 99% | 99% | 1% | 0% | 0% |
| 0% | 0% | 2% | 76% | 19% | 1% | 0% | 0% |
| 0% | 0% | 0% | 0% | 0% | 13% | 6% | 0% |
| 0% | 0% | 0% | 0% | 0% | 15% | 99% | 99% |
| 0% | 0% | 0% | 0% | 0% | 1% | 99% | 99% |
| 0% | 0% | 0% | 0% | 0% | 0% | 0% | 2% |

FIG. 12B

Thermal array

| 24.3 | 24.8 | 24.1 | 22.9 | 23.1 | 24.1 | 23.4 | 23.9 |
|------|------|------|------|------|------|------|------|
| 24.7 | 25.1 | 24.3 | 22.7 | 23.0 | 24.3 | 24.0 | 23.8 |
| 23.3 | 23.3 | 23.2 | 22.6 | 22.8 | 23.2 | 24.0 | 22.3 |
| 22.9 | 22.4 | 22.6 | 22.3 | 22.3 | 22.6 | 23.0 | 22.1 |
| 22.2 | 22.4 | 22.4 | 22.0 | 22.3 | 22.4 | 21.8 | 22.2 |
| 21.6 | 21.8 | 21.9 | 21.7 | 24.0 | 21.9 | 22.4 | 21.7 |
| 21.5 | 21.0 | 21.1 | 21.4 | 22.6 | 21.7 | 23.6 | 21.6 |
| 20.5 | 20.4 | 20.1 | 20.3 | 20.6 | 21.3 | 20.6 | 20.3 |

FIG. 16A

Probability array

| 91% | 99% | 84% | 0%  | 0%  | 41% | 92% | 69% |
|-----|-----|-----|-----|-----|-----|-----|-----|
| 99% | 99% | 91% | 28% | 0%  | 98% | 98% | 94% |
| 52% | 3%  | 18% | 13% | 0%  | 41% | 94% | 19% |
| 19% | 25% | 19% | 4%  | 16% | 16% | 10% | 12% |
| 9%  | 24% | 11% | 0%  | 33% | 13% | 7%  | 10% |
| 5%  | 6%  | 9%  | 1%  | 99% | 73% | 16% | 10% |
| 9%  | 0%  | 5%  | 0%  | 97% | 99% | 26% | 0%  |
| 16% | 13% | 7%  | 0%  | 0%  | 0%  | 22% | 26% |

FIG. 16B

SENSOR DATA ARRAY AND METHOD OF COUNTING OCCUPANTS

BACKGROUND

The field of the present disclosure generally relates to a sensor array, and more particularly, to a sensor array methodology and system to automatically determine the number of occupants in an area of interest.

In some instances, an area of interest such as, for example, a room within a building, a lobby of a building, a loading dock of a building, etc., may include one or more objects and/or people therein. In some instances and use-cases, there may be a desire to automatically detect and distinguish between the people (if any) in the area of interest and the objects therein. Additionally, accurately determining the number of people in the area (e.g., a conference room) may be desired. Knowing the number of people in, for example, a conference room, might be useful in managing the heating, ventilation, and air condition (HVAC) system(s) associated with the conference room, the lighting of the conference room, catering and/or other support services for the conference room, and the scheduling and provisioning of other resources (e.g., other conference rooms, work areas, meetings, etc.) in, around or otherwise impacted by the particular use of the conference room as determined, at least in part, by the number of people in the conference room.

Accordingly, in some respects, a need exists for methods and systems that provide an efficient and accurate mechanism for automatically determining, based on sensor data, the number of people (if any) in a particular area or space of interest.

BRIEF DESCRIPTION OF THE DRAWINGS

FIGS. 8A and 8B are illustrative depictions of thermal array representations, in accordance with one example scenario in an example process herein;

FIG. 10 is an illustrative graph, in accordance with some embodiments;

FIGS. 11A and 11B are, respectively, illustrative depictions of a thermal array and a probability array, in accordance with an example process herein;

FIGS. 12A and 12B are, respectively, illustrative depictions of a thermal array and a probability array, in accordance with an example process herein;

FIGS. 16A, 16B, and 16C are, respectively, illustrative depictions of a thermal array, a probability array, and a flag array, in accordance with an example process herein;

DETAILED DESCRIPTION

Figure 1:
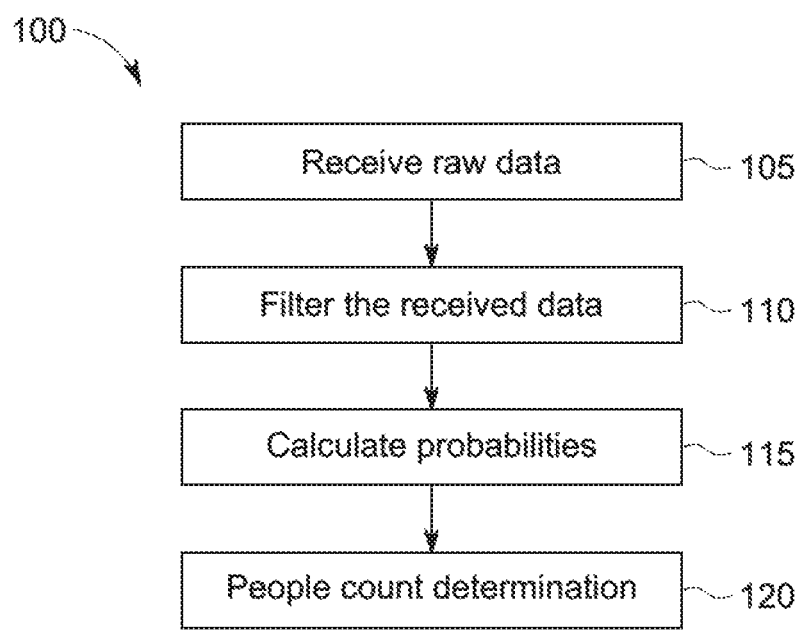
FIG. 1 is a high level overview of a process, in accordance with some aspects of an example process herein.

In some embodiments of the present disclosure, a method and system are provided that is capable of accurately counting the number of people in an area or space of interest (also sometimes referred to herein simply as a "space" and an "area"), such as a conference room. The methods and systems disclosed herein may use thermally sensitive sensors, such as thermopiles, including, for example, an array of thermopiles. In some aspects, one or more of a variety of technologies, including but not limited to, thermopile arrays, RADAR, pixelated images, gas sensors, ultrasound, passive infrared, etc. may be used in some embodiments of the present disclosure.

Some embodiments of the present disclosure are directed to a sensor array (e.g., a thermopile array) configured to acquire data regarding occupants in a space or an area of interest. In some embodiments, the space or area may be specified, such as relative to a local or universal coordinate system or reference (e.g., GPS coordinates, "Conference Room 1 in building 2" in a particular office park where the location of the room and building are known dimensions, etc.). In some embodiments, the area of interest may be defined to encompass the area or parts thereof within a field of view (FOV) of a sensor array. In general, sensory data is transmitted to a system (e.g., an embedded system) configured to perform operations for determining the number of occupants in the area or space. The determined number of occupants might be transmitted (via a wireless protocol, a non-wireless protocol, and combinations thereof) to a software platform (e.g., graphical user interface (GUI), app, application, or website) for monitoring and/or other types of processing.

In some aspects, data that is sensed by a sensor array herein may include an indication or representative information regarding "hot spots" in an area (e.g., a room), where the "hot spots" correspond to heat-emitting entities in the area. In an illustrative setting such as in a conference room or a movie theater, for example, there might be numerous heat-emitting sources. The heat-emitting sources that might be of greatest interest may be human (or other living beings, such as mammalian) occupants that might move into a room, remain mobile and/or come to rest within the space (e.g., sit or stand or lay down), while emitting heat from their body (such as from their head) while they do so. In some embodiments, methods and systems of the present disclosure may be used to count people in a room, such as a conference room, where all the people are sitting, all the people are standing, or a combination thereof. In accordance with the present disclosure, various aspects, processes, and mechanisms are presented to accurately count the number of occupants in a space or area, while distinguishing these occupants from other heat-emitting sources/entities that may also be in the room, including but not limited to, walls, lights, computers, display panels, etc.

In some regards, since human occupants typically move into and out of rooms or other spaces, it may be feasible to distinguish a human occupant's heat signature from stationary sources of heat. In this regard, stationary heat-emitting entities might be classified as being part of the "background" environment of a room.

As used herein, a thermopile is an array of thermocouples that may be interconnected in series. A section of the thermocouples might be placed in contact with a blackbody absorber, which will experience a temperature increase when infrared radiation is incident thereupon. In some aspects, the present disclosure may include sensor arrays other than those that acquire data from heat signatures. In some embodiments, sensors and sensor arrays that can acquire data from any effective portion of the electromagnetic spectrum might be used herein, as well as other sensor arrays that do not rely on emission or absorption of electromagnetic radiation. Accordingly, aspects of the present disclosure may be applicable to a variety of technologies and techniques, including but not limited, to thermopile arrays, radar, clear images, pixelated images, chemical (e.g., gas) sensors, ultrasonic sensing, passive infrared, combinations thereof, and others. In some embodiments, some sensed data may be acquired by cameras. Cameras might be used in situations where the occupants (e.g., people) in a particular space are moving. It is noted however that some embodiments of the present disclosure that use thermopile arrays may be effective at counting people in commercial office space.

Aspects and embodiments herein might be applied and useful in a variety of use-cases and contexts. One example use-case includes deployment and execution of a system and method disclosed herein in a commercial office space to determine the number of occupants in the office space. In some embodiments, systems and methods of the present disclosure may be tuned to counting the number of people sitting around a conference table, a desk, or a set of desks. However, the processes underlying the various embodiments herein are not limited to any one use or application, unless otherwise stated.

In some aspects herein, the data acquired from the sensor array may be filtered (e.g., in a preliminary operation) using a noise-reducing filter, including noise-reducing filters that are known and that may become known. The noise-reducing filter might be used to minimize background noise and/or environmental factors, and generate filtered data for input to a system that counts the occupants in the area of interest. In some aspects, the filtered data might include a "stream" of data.

In an initial operation, the (pre-)filtered data may be used to produce an estimate of the background environment of the area. The background environment is representative of the area when the area is devoid of any occupants.

In a further operation, the generated estimate of the background environment information may be combined with the filtered data and used to generate a probability that an occupant is present in the target area (i.e., area of interest).

In some embodiments, a list, listing, record, or other data structure including probabilities that an occupant is present in the target area may be provided to a device or process wherein the probabilities are subjected to, for example, a unique technique of "k-means clustering". Typically, ordinary types of k-means clustering are used to optimize the location of a centroid having many data points. Typically, a k-means clustering process needs to be supplied with the number of centroids prior to performing its algorithmic function. However, the present disclosure includes a system and method wherein aspects of k-means are used to optimize the total number of centroids, as well as the location of the centroid location. In accordance with some aspects of the present disclosure, an optimal number of centroids is determined, and each valid centroid might then be identified as an occupant or person in the target area of interest.

In some aspects and in more detail, a computer-implemented method of finding an optimal number of centroids might term a data point on a map corresponding to a sensor array having the highest probability of occupancy, as "Centroid 1". In order to identify a location on a map that will constitute "Centroid 2", the method should identify the furthest point among the flagged probabilities. In subsequent steps of the computer-implemented method of finding centroids, the method may further consider whether a third, fourth, fifth, etc. centroid exists, based on a specified set of rules/constraints.

In some regards, the processes and mechanisms disclosed herein may operate to overcome the challenge(s) of distinguishing between people and inanimate objects/entities in a particular space or area, as well as accurately determining the correct number of people in the area. In some aspects, the determination of a high probability of an occupant at a given location may be relatively straightforward, whereas interpreting or processing of the determined probabilities to determine a correct count of the occupants in the area might be challenging. The present disclosure provides a mechanism to efficiently and accurately determine the number of occupants in an area of interest.

In some specific embodiments, some aspects of the present disclosure may use an 8×8 thermopile array for generating sensing data (e.g., a temperature map), and a 32-bit microcontroller for data processing. An accurate occupant count of up to 95% has been realized by Applicant using such a configuration. However, the present disclosure is compatible with and may encompass other sensor arrays and processor types. Accordingly, while some of the following examples might employ an 8×8 thermopile array, the methods and systems of the present disclosure are not limited thereto, unless otherwise specifically stated.

Referring to FIG. 1, a brief overview of an embodiment for a processor-implemented process 100 for accurately and efficiently counting people in an area of interest by a system executing a process herein is disclosed. At operation 105, raw data is collected from an array of sensor-pixels in the sensor array. In an illustrative example, the raw data may be collected using, for example, a Grid-EYE® sensor array. The raw data may be collected from a sensor. In some embodiments, the sensor may be referred to as a "grid" sensor. One example of a sensor suitable for employment in embodiments of the present disclosure is a Grid-EYE® sensor. This is one possible commercial source for a thermopile array sensor, although other pixel infrared array sensors may be used. In this example, there may be 64 individual aperture/sensors on the sensor grid or array, arranged in an 8×8 array.

At operation 110, a data filter is applied to the raw data. A probability calculation is performed at operation 115, based at least in part on the filtered data, to calculate the probability that person(s) are in the area of interest. Continuing with overview process 100, a determination of a count of people is performed at operation 120, based at least in part on the calculated probabilities.

In some aspects, once probabilities are calculated for each array, a number of operations may be executed to determine the number of people that are in the sensed space, based on where the probabilities are distributed within the array of sixty-four (i.e., 8×8) pixels.

Figure 2:
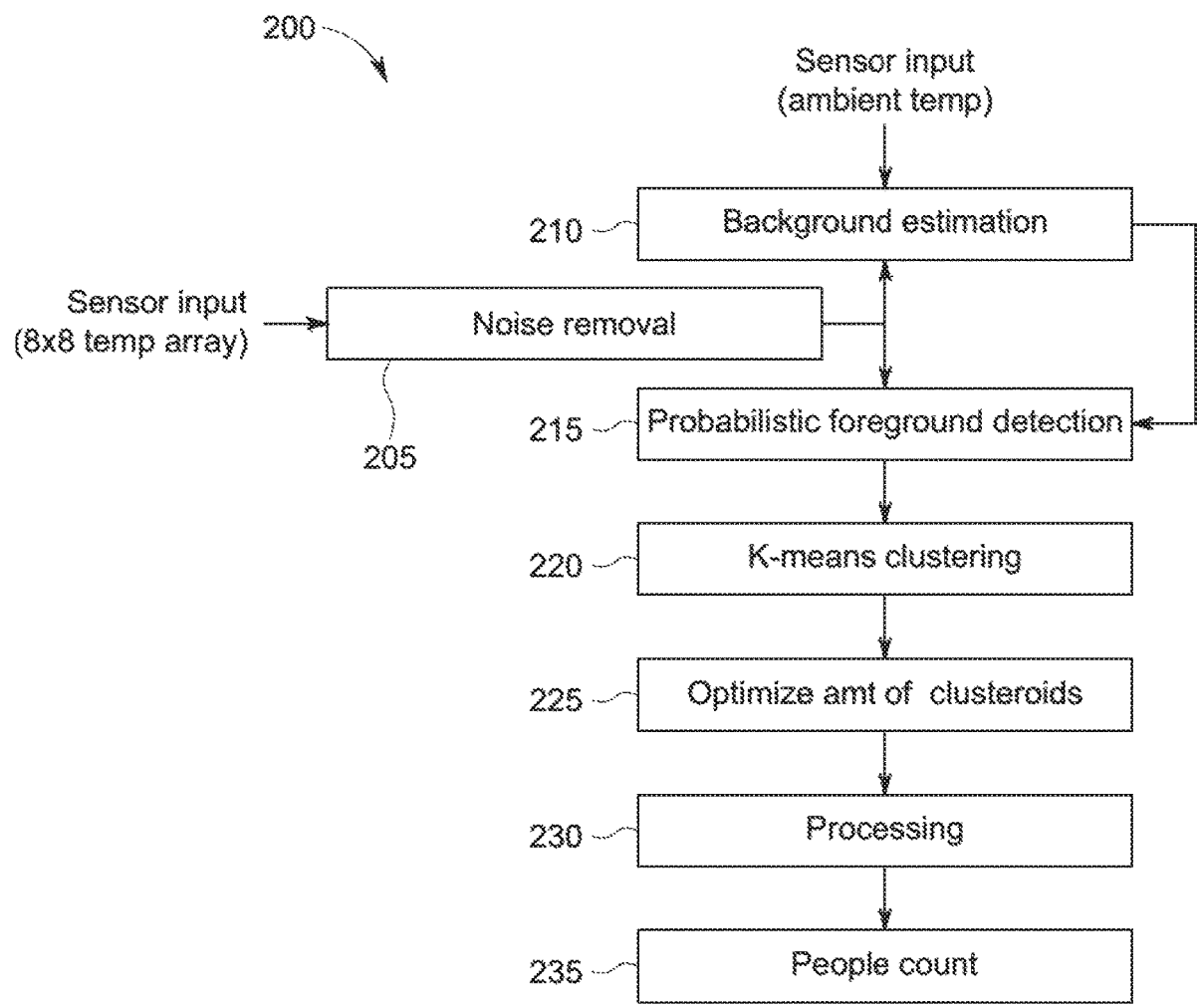
FIG. 2 is an illustrative flow diagram of a sensor data array process of counting occupants of an area, in accordance with some embodiments.

Prior to discussing greater details regarding different aspects of process 100, another perspective of some aspects of the present disclosure is presented. FIG. 2 includes an illustrative flow diagram of a process 200 for accurately determining the number of, for example, people in an area of interest based on an input of sensor array data. The example of FIG. 2 uses an 8×8 sensor array that generates sensor data representative of the temperature at or under each pixel of the sensor array. The sensor provides data including an 8×8 temperature array at operation 205, where a filter may be used to remove noise from the sensor data. In some embodiments, a Kalman filter may be used to stabilize the output of each pixel reading at operation 205. At operation 210, an ambient temperature is received. The ambient temperature might be received from the 8×8 sensor array (e.g., a thermistor on-board the sensor array) in some embodiments, although it might be received from another, separate sensor in some embodiments. The ambient temperature is used at operation 210 to determine a background estimation, indicative of the area in the absence of any human occupants.

As seen in FIG. 2, the filtered data from operation 205 and the background estimation from operation 210 are used in combination to determine or detect the probability of a human occupant in a foreground of the area of interest covered by the 8×8 sensor array at operation 215. Operation 220 applies k-means processing on the determined probabilities from operation 215 to determine clusteroids, where the clusteroids are indicative of a potential person in the area. At operation 225, the number of clusteroids is optimized. Further processing of the optimized amount of clusteroids is performed at operation 230 to generate an accurate count of people in the area of interest at operation 235.

Figure 3:
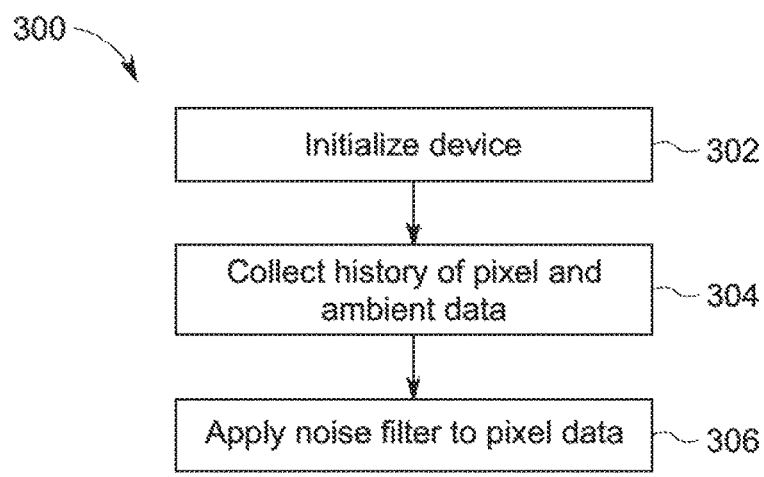
FIG. 3 is an illustrative flow diagram of some aspects of a sensor data array process of counting occupants of an area, in accordance with some embodiments.

FIG. 3 is an illustrative depiction of a flowchart for a process 300, in accordance with some embodiments herein. Process 300 generally includes three phases of execution, an initialization 302 of a microcontroller executing process 300, a sensor measurement phase 304, and a noise filtering phase 306. The example of FIG. 3 may use an 8×8 array of sensors, resulting in 64 different data points, where a pixel temperature is acquired for each data point. The initialization of the microcontroller is not a focus of the present disclosure and is thus not discussed in detail herein. Importantly, sensor measurement phase 304 includes a recursive loop wherein the acquisition of pixel temperatures and ambient temperature is performed multiple times (e.g., ten (10) different times, or more) to create a history of data. Significantly, a background set of temperature data (e.g., data from an empty space or target area) is collected that can provide a representative history of the area. This set of background temperatures can be later used in distinguishing the background from the foreground. A pixel data array is constructed. In one example, the pixel data array may be a 10×64 array, that is, there are 64 different data points, showing temperatures at each of the 64 different (pixel) positions, and ten different acquisitions for each of those sixty-four data points. Accordingly, the data measured in sensor measurement phase 304 is the source of the 10×64 data array. It is noted that a different number of temperature pixel points, greater than or less than 64, may be acquired depending on the configuration of the sensor array in different example scenarios. Also, the plurality of measurements (i.e., samplings) performed may be greater than or less than the 10 of the present example. In some aspects, the number of measurements performed might be tuned or optimized based on a number of factors, which might vary depending on a particular application or use-case, a desired level of accuracy, execution speed, environment variability, and other considerations. Process 300 then proceeds to the noise filtering phase 306, wherein the data array is provided to a noise filter (e.g., a Kalman filter). In some aspects, the noise filter may be configured as a Kalman filter or any other effective type of process or technique to eliminate or minimize noise in the sensor data.

In an embodiment to acquire the background temperature estimate profile for the array (FIG. 2, operation 210), the ambient temperature is generally acquired. In some embodiments, a thermistor may be used to determine the ambient temperature condition. As an example, one embodiment may use an on-board thermistor for collecting ambient thermal data. In some embodiments, the ambient thermal data may be represented by, for example, 2 bytes having a resolution of about 0.0625 degrees C., which might be considered a reasonably low-noise signal. A history of the ambient temperature at (or around) the sensor is collected.

Figure 4:
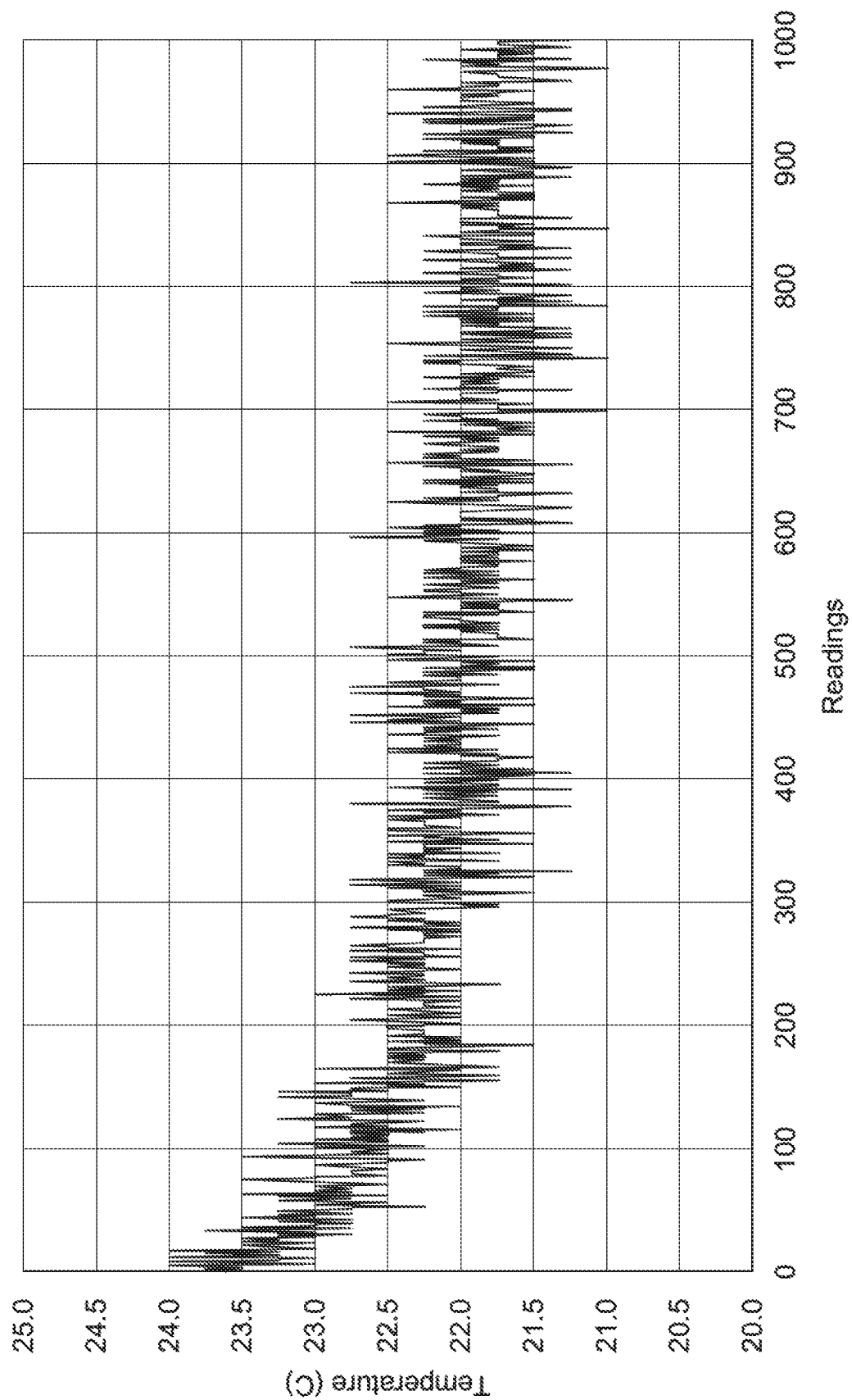
FIG. 4 is an illustrative graph of raw data, in accordance with some embodiments.

In contrast to the ambient temperature estimate profile, signal data collected from the temperature sensor array can be noisy, and additionally, a thermal gradient might possibly develop due to sensor on-board heat. FIG. 4 is an illustrative depiction of raw data collected from an example pixel, which is sent through a Kalman (or other type of noise) filter, as noted previously. It is reiterated that a history of pixel data is collected prior to being sent to the filter. The true signal is estimated/determined as a weighted calculation of what is being currently read (sensed), as well as a best estimate from a previous reading. In some embodiments, a Kalman gain is calculated for each pixel, which measures a current reading weighted by its history. An illustrative equation representing the functioning of the Kalman filter for this example is shown as:

$$\hat{X}_k = K_k \cdot Z_k + (1 - K_k) \cdot \hat{X}_{k-1}$$

where $\hat{X}_k$ represents the current estimation; $K_k$ represents the Kalman gain; $Z_k$ represents the measured value; and $\hat{X}_{k-1}$ represents the previous estimation. Each reading updates and re-filters the current reading, the result of which is a new estimate of what the filter estimates the actual signal to be.

Figure 5:
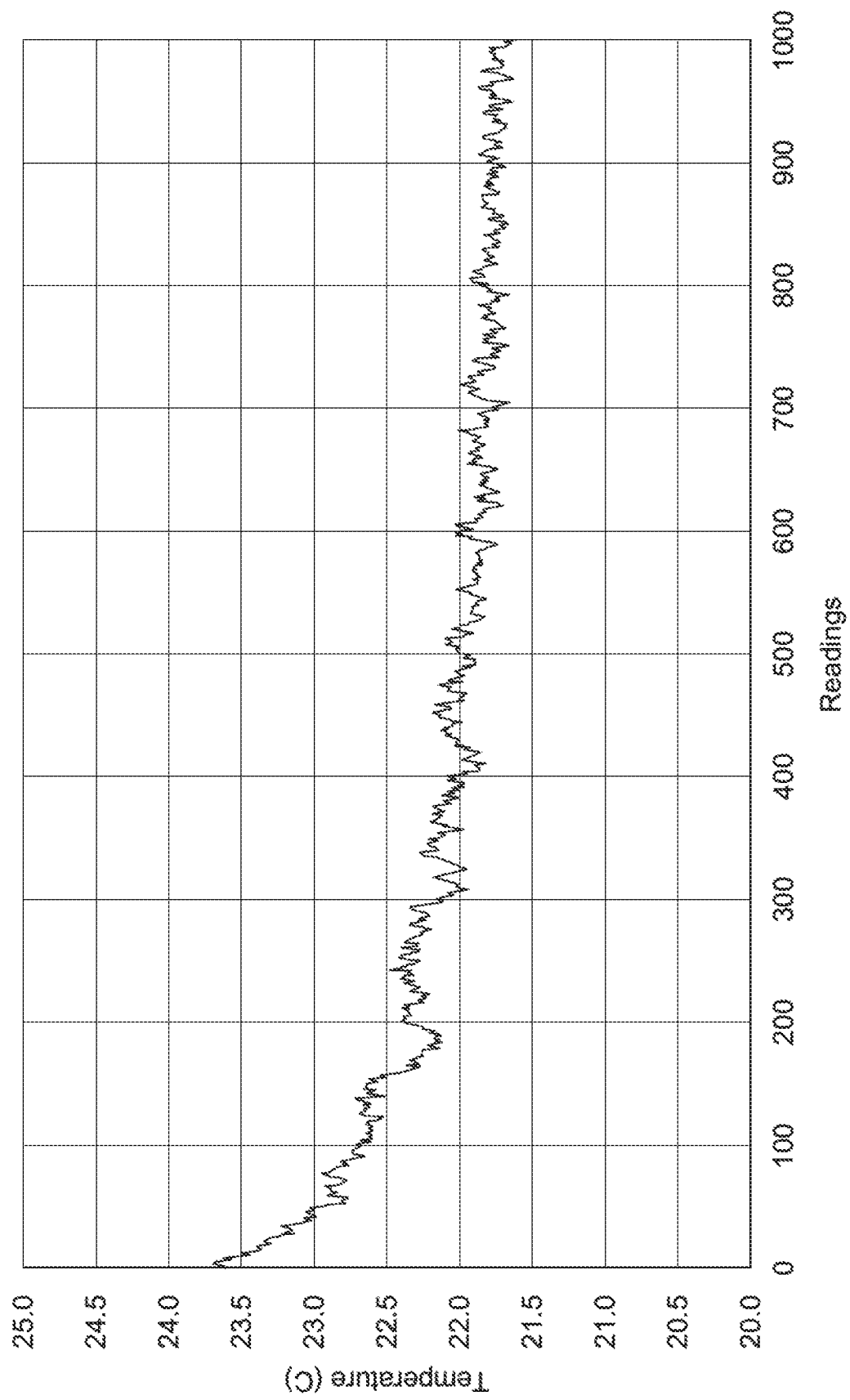
FIG. 5 is an illustrative graph of filtered data, in accordance with one example scenario in an example process herein.

FIG. 5 is an illustrative depiction of the filtered data signal from an example pixel, which is a relatively smooth function as compared to the fluctuating black line graph of FIG. 4. As seen in FIG. 5, the spikes shown in the original data signal have been reduced as a result of the filtering.

Different values of sensitivity of the filter itself may be adjusted. For example, when a person is moving through the space under observation, various adjacent pixels may be highlighted in response to heat from the moving person's head. In some embodiments, the filtering process may filter out such a moving person and not count them in the occupancy counting system, while other embodiments may be designed to detect the moving person.

Figure 6A:
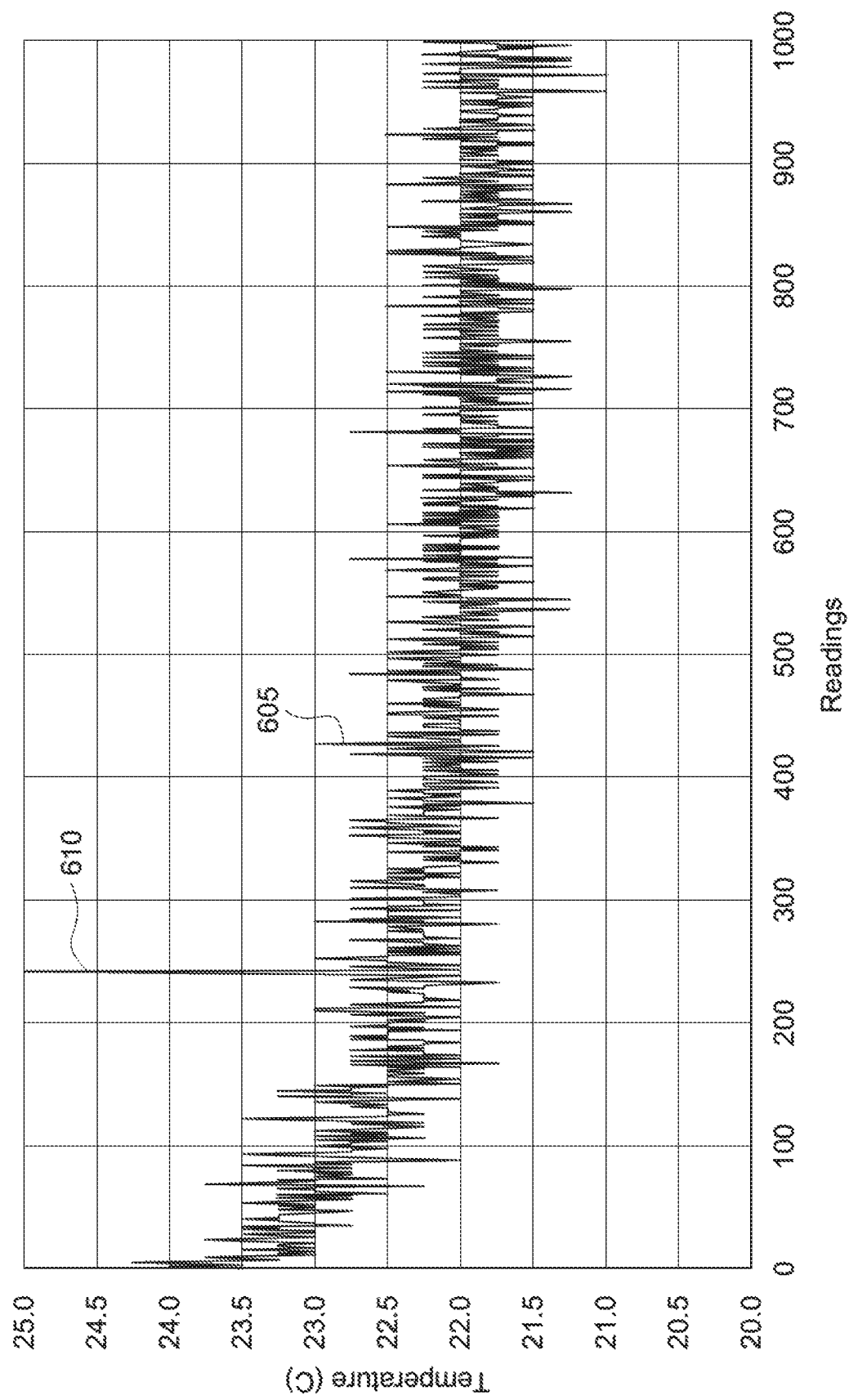
FIGS. 6A and 6B are, respectively, illustrative depictions of raw data and filtered data, in accordance with another example scenario in an example process herein.
Figure 6B:
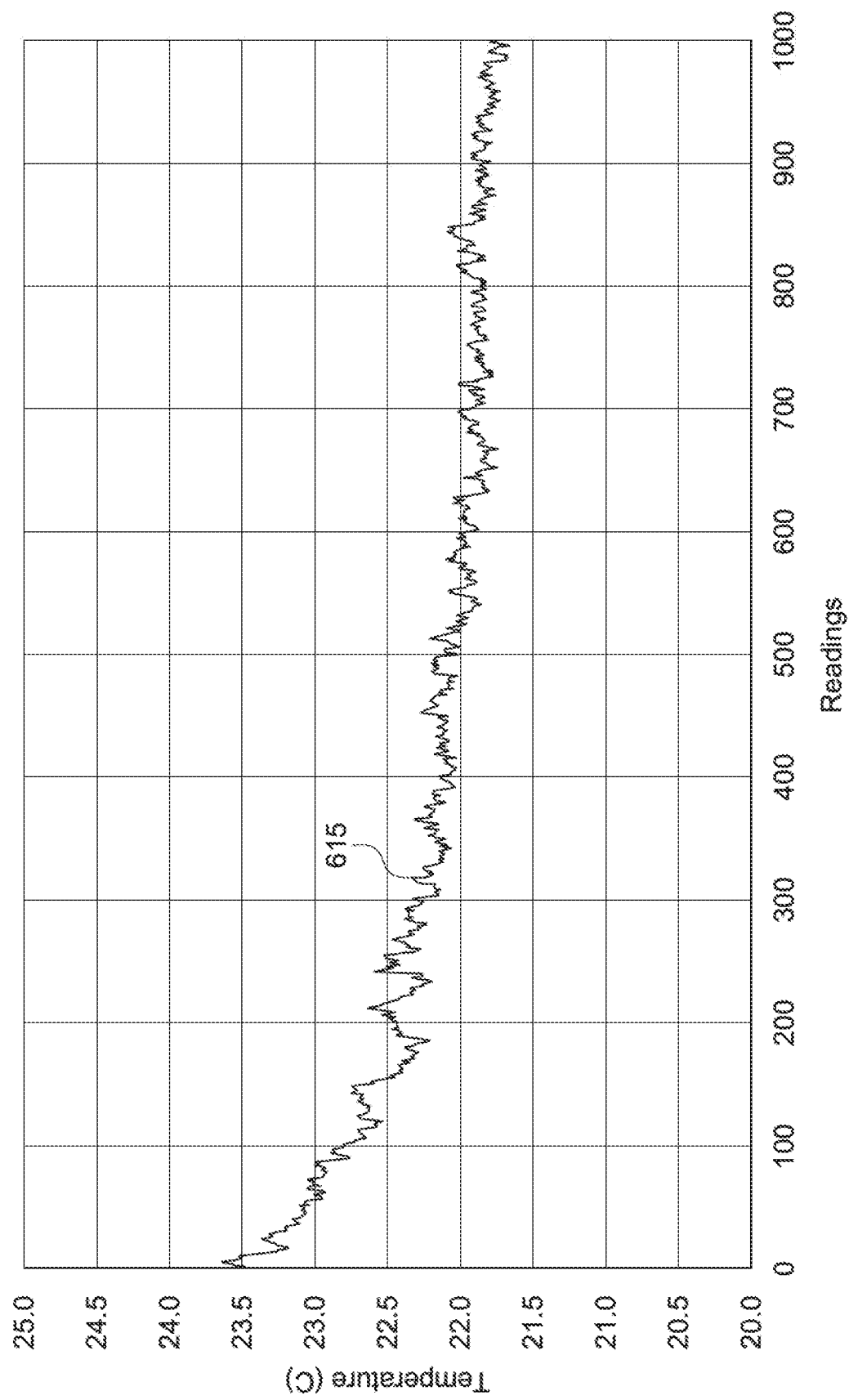

FIG. 6A is an illustrative depiction of a raw data signal 605 including a spike 610 due to the motion of a person walking underneath a pixel sensor. However, the filtering function/process may be tuned to remove this spike, as shown in filtered data graph 615 in FIG. 6B.

Figure 7A:
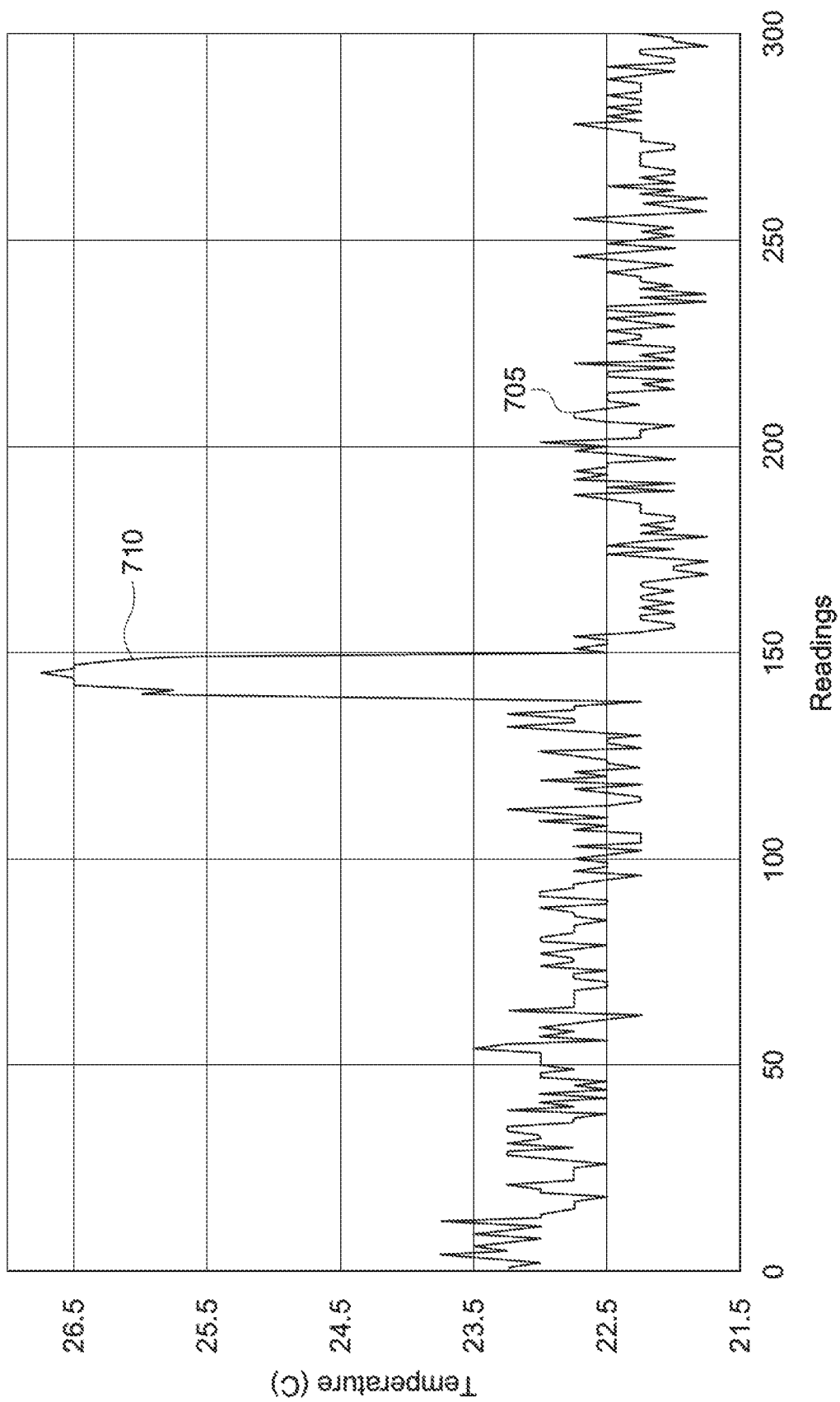
FIGS. 7A and 7B are, respectively, illustrative depictions of raw data and filtered data, in accordance with one yet another example scenario in an example process herein.
Figure 7B:
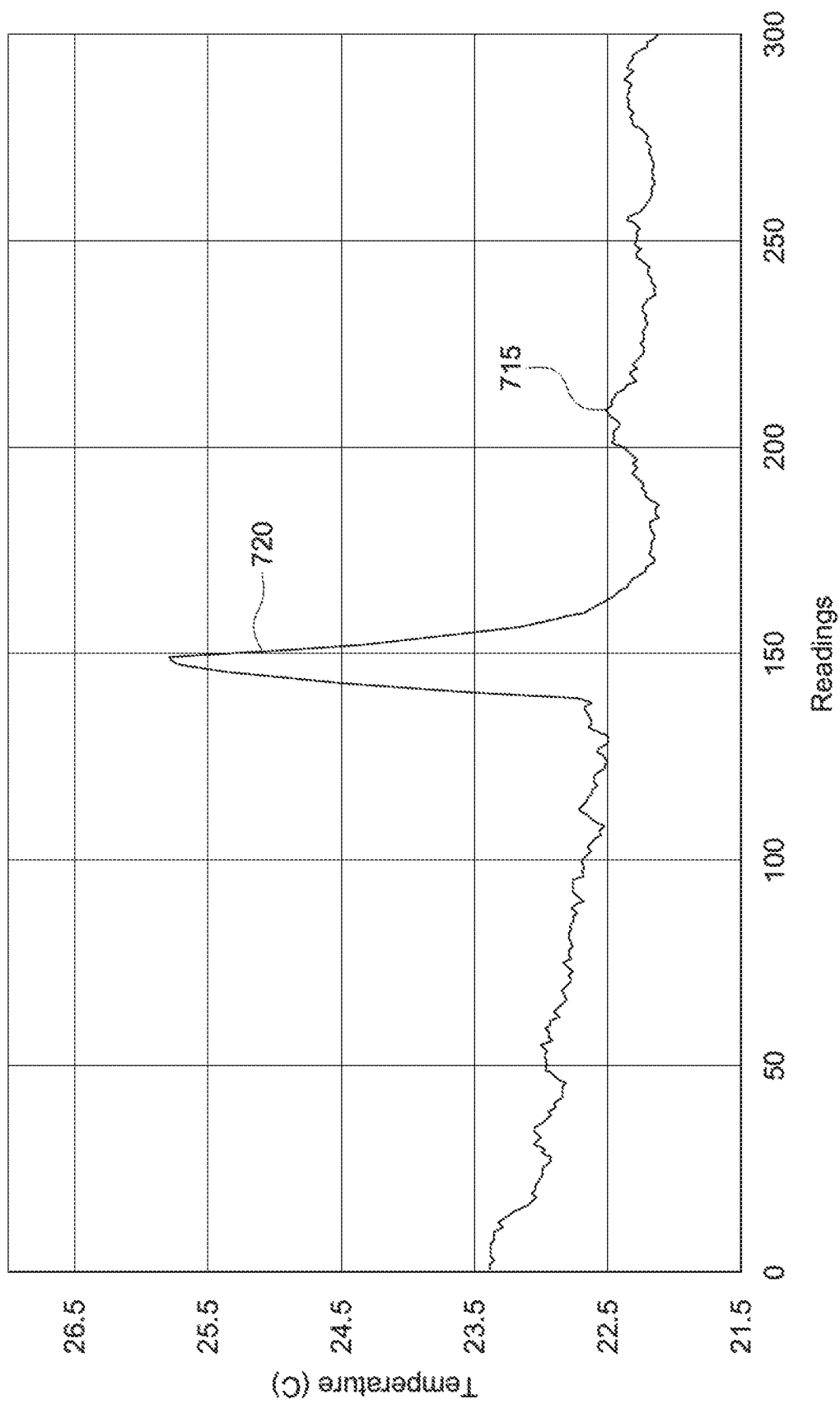

FIG. 7A shows an illustrative depiction of a raw data signal 705 for a pixel of the sensor array when a person is substantially stationary underneath the pixel, as indicated by the rise 710 in the raw data signal. The filtered data signal 715 in FIG. 7B clearly includes a spike at 720, indicative of the stationary person positioned at or under the graphed pixel. The rise in the filtered signal will contribute to the probability that a person is actually located or positioned underneath that pixel. In some embodiments, the filtering process or mechanism of the examples of FIGS. 7A and 7B may be tuned or adjusted to take into account the length of time (i.e., threshold time) a person will have to be stationary in order for them to be counted within the parameters of the system.

FIG. 8A is an illustrative depiction of a thermal array 800 of an 8×8 sensor array for a field of view (FOV) that is empty. That is, FIG. 8A is a representation of the background for the area under the sensor array, corresponding to there being an absence of any person within the depicted FOV. In general, when there is no person within the field of view, each pixel will likely have a temperature that is comparable to that of adjacent pixels. As used herein, the term "comparable" should be taken to indicate that the temperature difference between adjacent pixels is within certain preselected tolerance limits. However, FIG. 8B shows the thermal array 800 corresponding to the situation where a person is within the FOV of the sensor array. Relative to selected pixels (e.g., 805, 810, 815, 820, and 825), a hot spot (e.g., a temperature of about 24° C.) is readily apparent on the temperature map of the thermal array shown in FIG. 8B. In some embodiments, the hot spot may be displayed in one or more colors (e.g., red) in contrast or relative to the background, cooler pixels (e.g., a temperature of about 22° C.), which may be displayed, for example, in a blue or green color on the thermal (i.e., temperature) array map. In some regards, the colors chosen for the temperature map representations might be varied from the example of FIGS. 8A and 8B.

Figure 9:
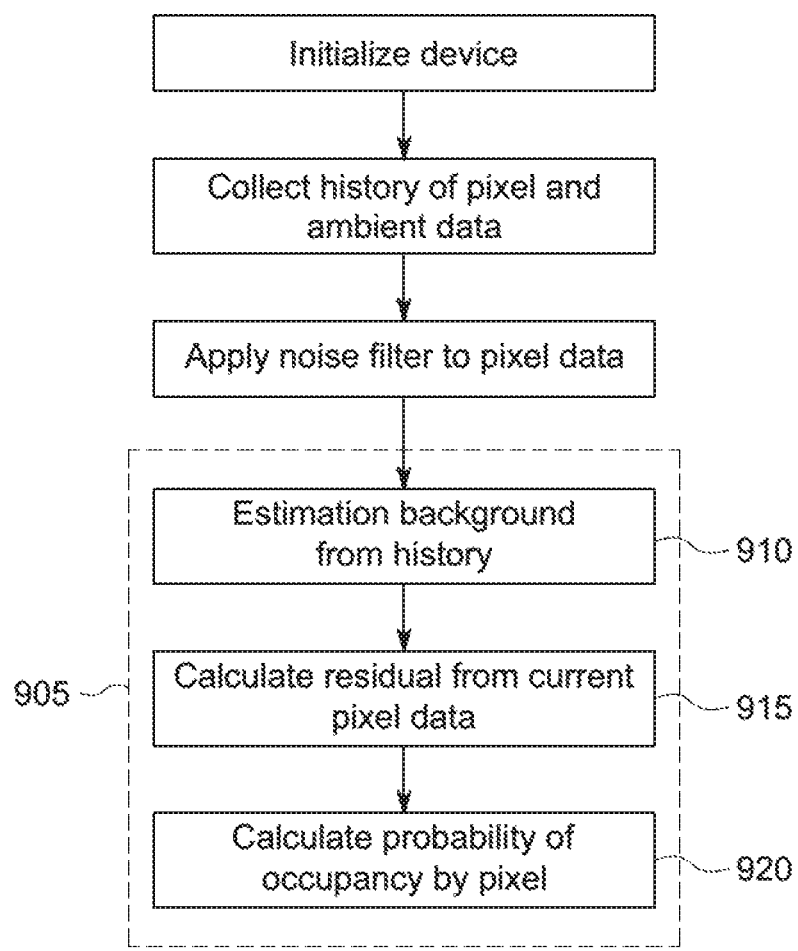
FIG. 9 is an illustrative flow diagram of some aspects of a sensor data array process of counting occupants of an area, in accordance with some embodiments.

FIG. 9 further builds on the flow diagram shown in FIG. 3, including a probability calculation process 905. Aspects of FIG. 9 previously discussed are not repeated here. In particular, as part of the probability calculation, the background of each pixel is estimated (910) from the filtered pixel and ambient data history, a residual is calculated for each pixel (915) by comparing current pixel data with the background estimate, and a probability is calculated for each pixel (920) from the calculated residual.

In some embodiments, the background estimation is described as further shown below:

$$A = \begin{bmatrix} 1 & T_a(t-1) \\ 1 & T_a(t-2) \\ \vdots & \vdots \\ 1 & T_a(t-10) \end{bmatrix} \quad B = \begin{bmatrix} T_{i,j}(t-1) \\ T_{i,j}(t-2) \\ \vdots \\ T_{i,j}(t-10) \end{bmatrix}$$

$$\hat{\beta}(t) = A^+ B$$

$$\hat{T}_{b(i,j)}(t) = \begin{bmatrix} 1 & T_a(t) \end{bmatrix} \cdot \hat{\beta}(t)$$

In some instances, the last ten ambient temperature readings ($T_a$) may be used to form the A matrix above, while the last ten filtered pixel temperatures ($T_{i,j}$) may be used to form the B matrix above. On a pixel by pixel basis, an expected background temperature ($\hat{T}_{b(i,j)}$) for a given pixel is calculated. This calculation is performed based on the acquired history data. A best fit line is calculated; it is based on a history of ten ambient temperatures and a history of ten background temperatures for the pixel. A temperature of the pixel is then estimated based on an assumption that there is no person in the field of view of that pixel. A residual (R) is then calculated based on the equations below. The calculated residual is the difference in two different values—the current filtered value of a particular pixel (TO versus an estimated background of that pixel. If the residual is above some threshold, then the previous fit for a background estimation may be used to ensure the background estimate is not skewed by occupancy. Using the calculated residual, a probability p may be calculated. Based on adjustment of a sensitivity parameter k (shown below), a size of a residual corresponding to a magnitude of a probability can be tuned.

$$R(t) = \left(\hat{T}_{b(i,j)}(t) - T_{i,j}(t)\right)^2$$

If $R(t) \geq R_{th}, \hat{\beta}(t) = \hat{\beta}(t-1)$ $$p(T_{i,j}(t)) = 1 - \frac{2}{1 + e^{k \cdot R(t)}}$$

FIG. 10 is an illustrative graph including different plots for different values of k. It is noted that the probability arises from a difference between what the algorithm expects the temperature to be, versus the actual temperature.

FIGS. 11A and 11B together represent an illustrative depiction of a translation of the pixel data in FIG. 11A into an array of probabilities of a person standing under any particular pixel as shown in FIG. 11B. FIGS. 11A and 11B illustrate an example of the sensitivity of the system, wherein a very small temperature elevation gradient shown in FIG. 11A (e.g., a temperature difference of 2-3 degrees C.) is translated into probabilities in FIG. 11B of up to 99%, relatively to substantially 0% for most of the other pixels. In some embodiments, even if a given pixel shows a small degree of elevated temperature relative to an expected background temperature, this can non-linearly translate into a high probability, such as ninety percent probability of a person being under that pixel.

FIGS. 12A and 12B depict a more complicated situation wherein two people are located underneath the grid array sensor. It is noted that since the probabilities for determining whether a person is present will depend on the history of heat producing sources in the room, the sensor array and associated algorithm(s)/calculation(s) may generally not count constant heat sources towards the probability of there being a person in the room. As used herein, "constant heat sources" may include objects such as, for example, servers or computers that are always powered on, light sources or other heat sources that do not change and can thus be considered part of the background. Due to potential gradients that can occur in the grid array sensor with on-board heating or other effects, the temperature array alone may not always clearly indicate the presence of a person. In FIG. 12B, the highlighted blocks at 1215 and 1220 correspond to the highlighted temperature values 1205 and 1210, respectively, in FIG. 12A, where the probability of a space under the pixel being occupied by a person is shown in FIG. 12B. As can be seen, the presence of a person in the highlighted temperature values 1210 may not be immediately evident, however the corresponding highlighted probability values 1220 clearly depict the person with 99% probability.

Figure 13:
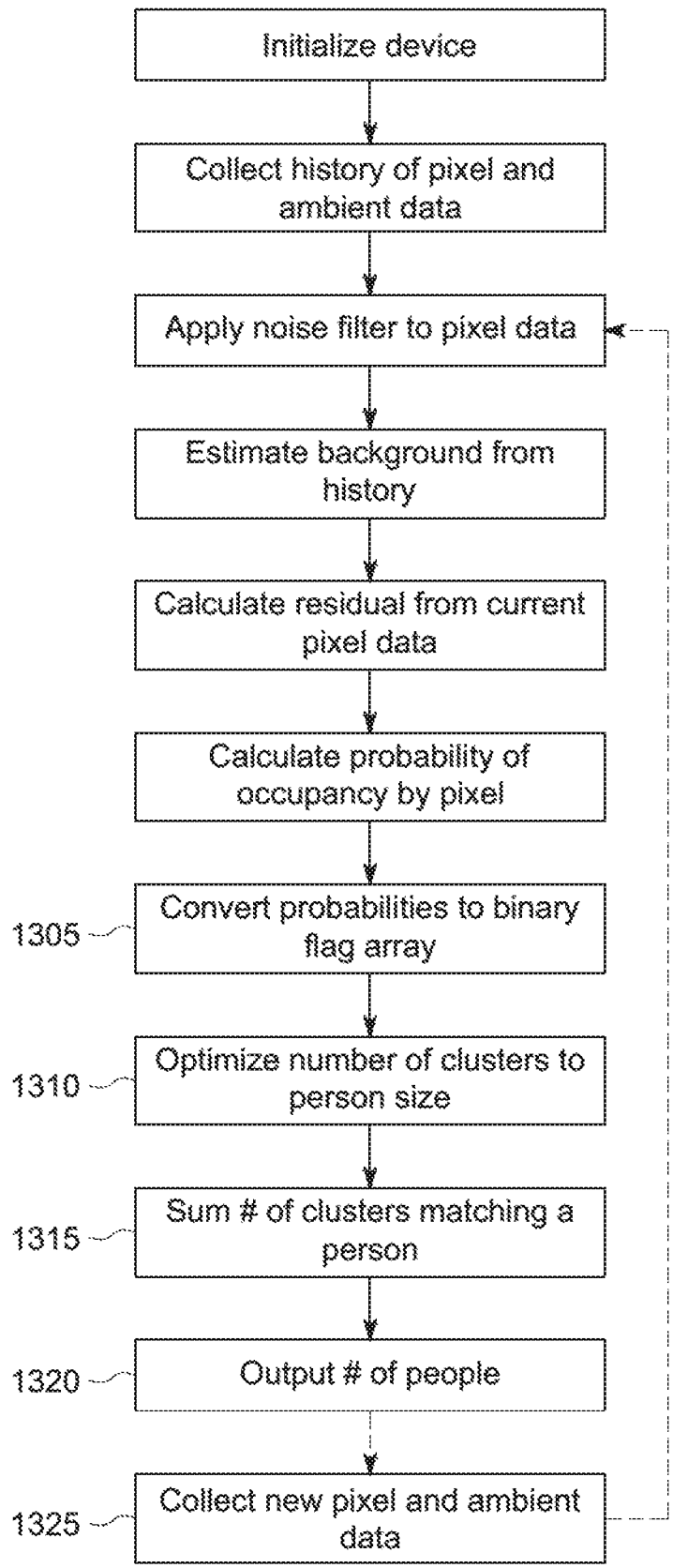
FIG. 13 is an illustrative flow diagram of some aspects of a sensor data array process of counting occupants of an area, in accordance with some embodiments.

FIG. 13 further builds on the flow diagram shown in FIG. 9, including operations for determining an optimal number of centroids and ultimately, an optimal number of occupants in the area of interest covered by the sensor array. Aspects of FIG. 13 previously discussed are not repeated here.

In some embodiments, the pixel data is mathematically processed by k-means clustering to determine an optimal number of clusters. A first aspect in a series of operations that constitutes k-means clustering is the determination of an optimal centroid. A centroid herein refers to a weighted central location of all the hotspots in an array. For instance, all of the pixels that have been identified (i.e., flagged) as having a high probability of there being a person underneath the pixel are input into the calculation of the location of the centroid in the array. Referring to FIG. 13, operation 1305 considers whether the probability for each pixel in the array (e.g., 64 pixels) meets or exceeds a threshold value to be classified as likely being over a person. Additional parameters, such as temperatures of surrounding pixels, may be used in addition to the probability values to develop an array of flagged pixels. The array of flagged pixels may be used to help simplify the clustering algorithm, but, in some embodiments, is not necessarily required.

Operation 1310 operates to assign the flagged pixels to a cluster. In general, what is being accomplished is an optimization of the distance from a flagged pixel (i.e., a pixel having a high probability of a person underneath) with the centroid of a cluster. These distances are important for determining how many people are in the room. In some instances, the distance calculated may be too large to correspond to the size of a person. If that is the case, then an initial step may assign only one centroid to a situation where there are (at least) two people in a room. However, if there are two people in the room there may be about two hotspots in the array and the distances from each hotspot to the centroid will be too large to be physically meaningful. Therefore, a second cluster will be added. Once a second cluster is added, a usual result is that the centroids of the clusters appear to exist closer to the location of the hotspots. In some other instances, the size of a cluster (i.e., number of pixels assigned to the cluster) may be too small to correspond to the size of a person. If that is the case, then the cluster remains for calculations, but is not counted as a person, as it is likely some other heat-producing object that was brought into the sensor's field of view, such as a laptop or cup of coffee. Once the optimal number of clusters has been found, operation 1315 sums the clusters that represent a person and operation 1320 outputs the number of people based on the calculated clusters. The ultimate result of the disclosed series of steps is that each person corresponds to a single cluster. The process is then repeated with operation 1325 as a new set of pixel and ambient data is collected and the calculations are repeated iteratively.

Figures 14A, 14B:
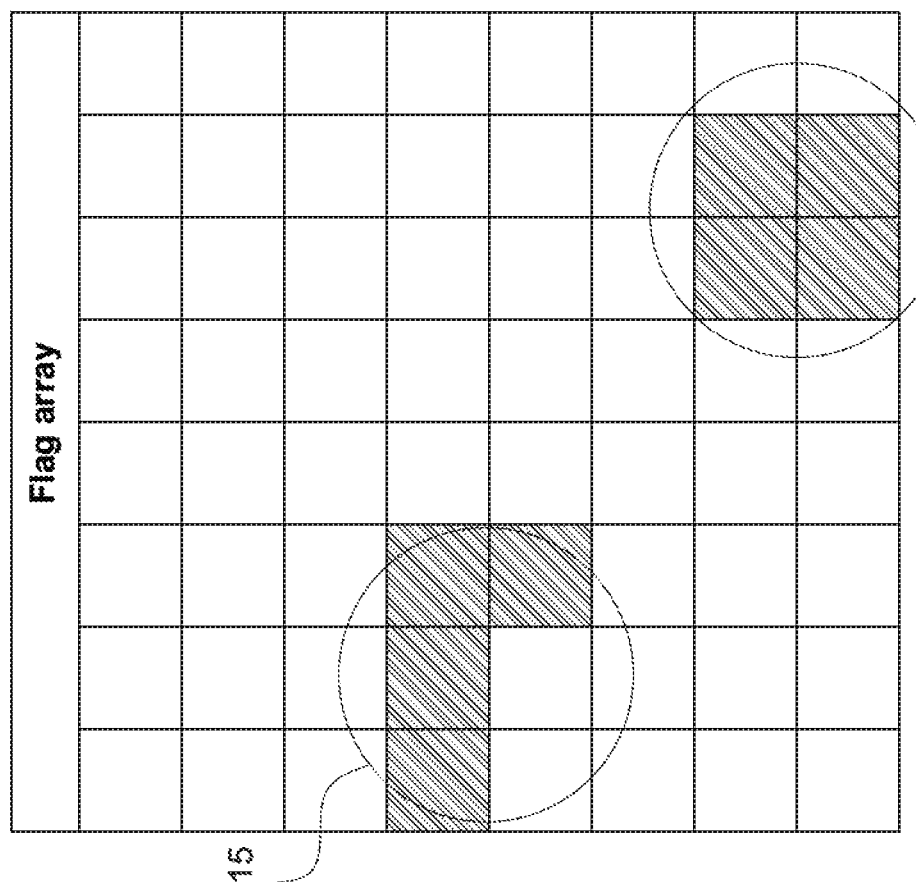
FIGS. 14A and 14B are illustrative depictions of a probability array and a flag array, in accordance with an example process herein.

In some embodiments, it may be advantageous to convert the probability for each pixel to a binary flag (operation 1305 of FIG. 13), as illustrated in FIGS. 14A and 14B. In general, this process includes assigning either a yes (1) flag or a no (0) flag to each pixel, instead of assigning probabilities from a range of 0 percent to 100 percent for each pixel. For example, in one instance of a predetermined or set threshold of 80%, every probability above eighty percent corresponds to a yes flag. Other thresholds may be possible, and/or additional parameters may be used to determine the flag array. FIG. 14A is an illustrative probability array with two hot spots or clusters, 1405 and 1410, including probabilities greater than 80%. Accordingly, the flag array in FIG. 14B includes flagged pixels (i.e., pixels designated with a "yes" or "1") at 1415 and 1420, which correspond to the pixels in FIG. 14A having a probability greater than 80%.

Figure 15B:
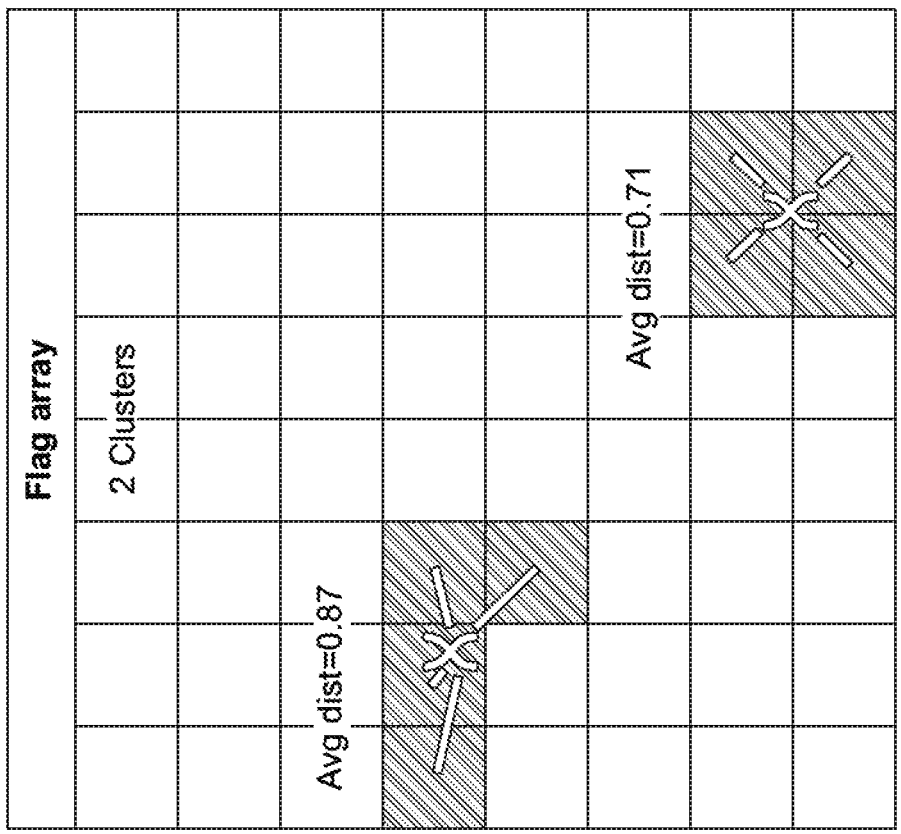
FIGS. 15A and 15B are illustrative depictions of a flag array, in accordance with an example process herein.
Figure 15A:
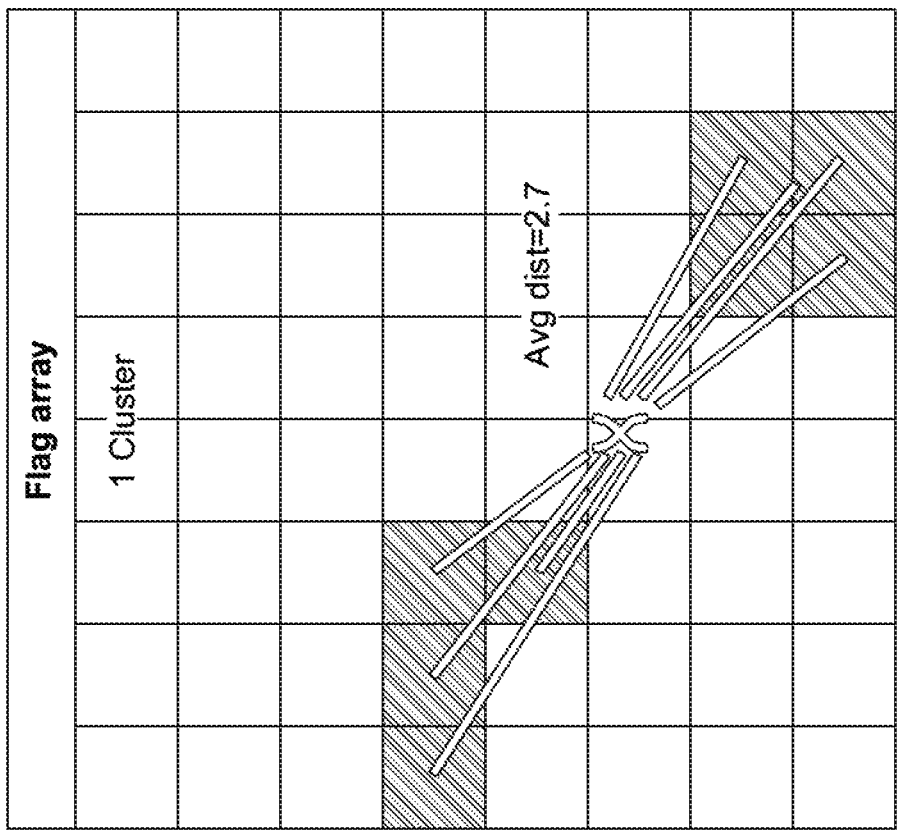

In some embodiments, the people count determination (operation 1310 or FIG. 13) starts with a cluster and finds the centroid for all of the "yes" pixels. The average distance of all the pixels from that centroid are examined. In the case shown in FIG. 15A, the average distance is calculated to be about 2.7 pixels in distance. A distance of 2.7 pixels (in this example) is considered to be too large to correspond to the identification of a single person. Thus, a second cluster is added and new distances are calculated from each pixel to the closest cluster centroid. Through an iterative process of k-means clustering, the location of each cluster centroid is optimized based on the locations of the assigned pixels. In this instance, the distance becomes about 0.9 pixels or less as seen in FIG. 15B, which indeed does correspond to the identification of a single person in this example. Accordingly, each of the two clusters corresponds to a person for a total of two people in the area of interest. The threshold distance indicative of a person can be adjusted based on the installation environment, and may depend on a variety of factors, including one or more of, for example, sensor mounting height, sensor field of view, and sensor array resolution.

Figure 16C:
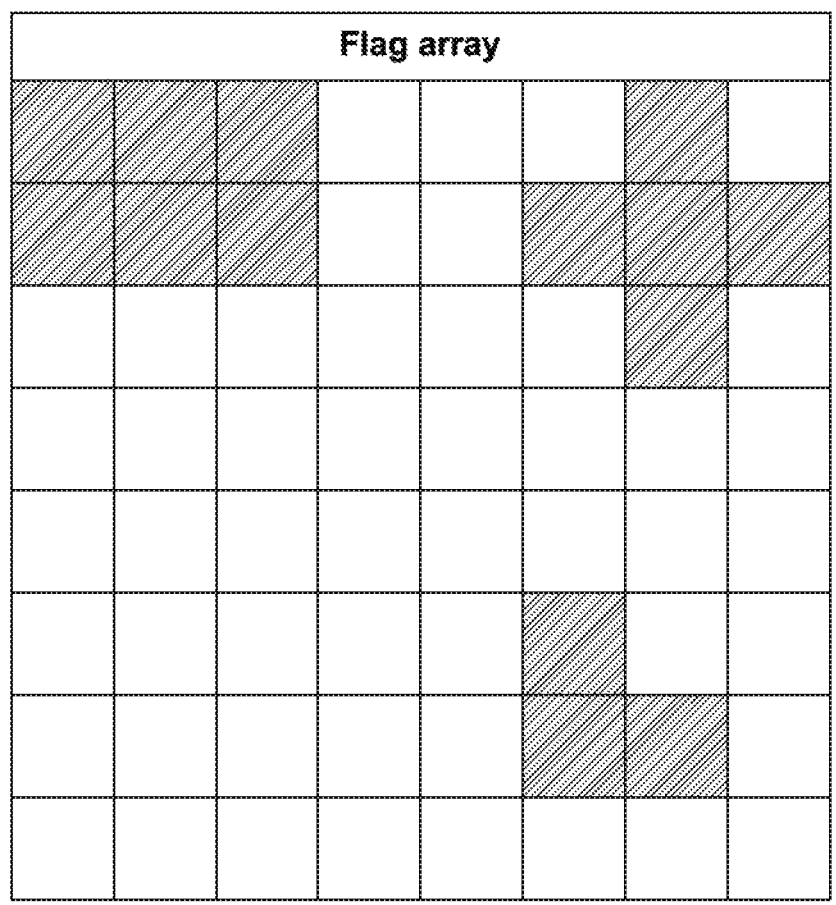
Figure 17B:
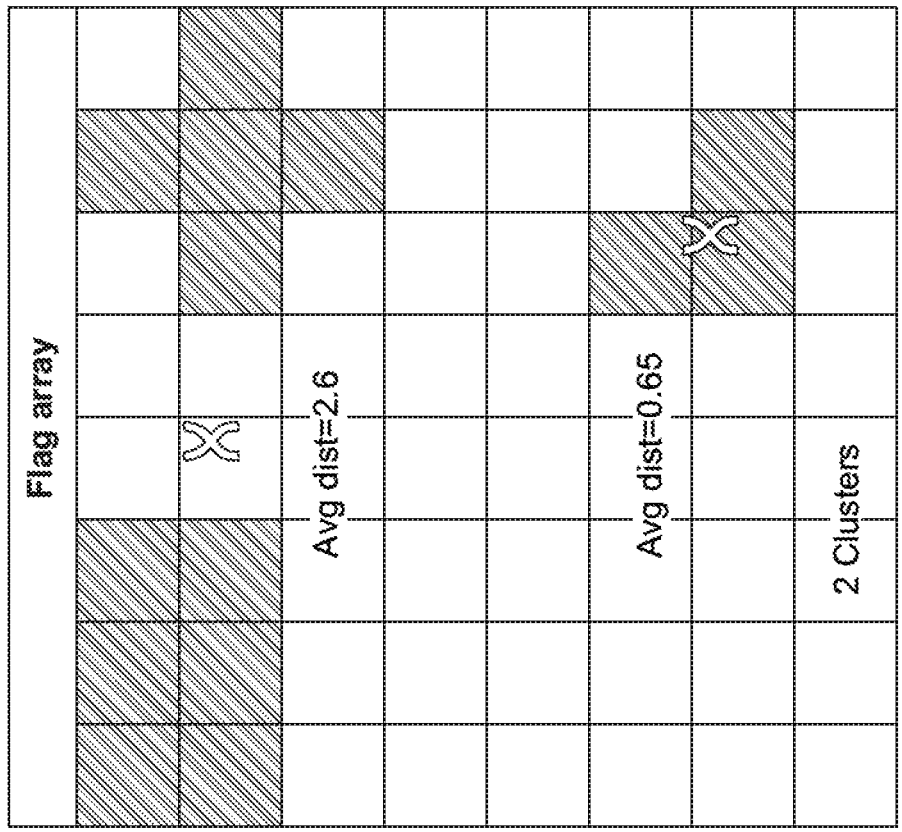
FIGS. 17A-17C are each illustrative depictions of a flag array, in accordance with an example process herein.
Figure 17A:
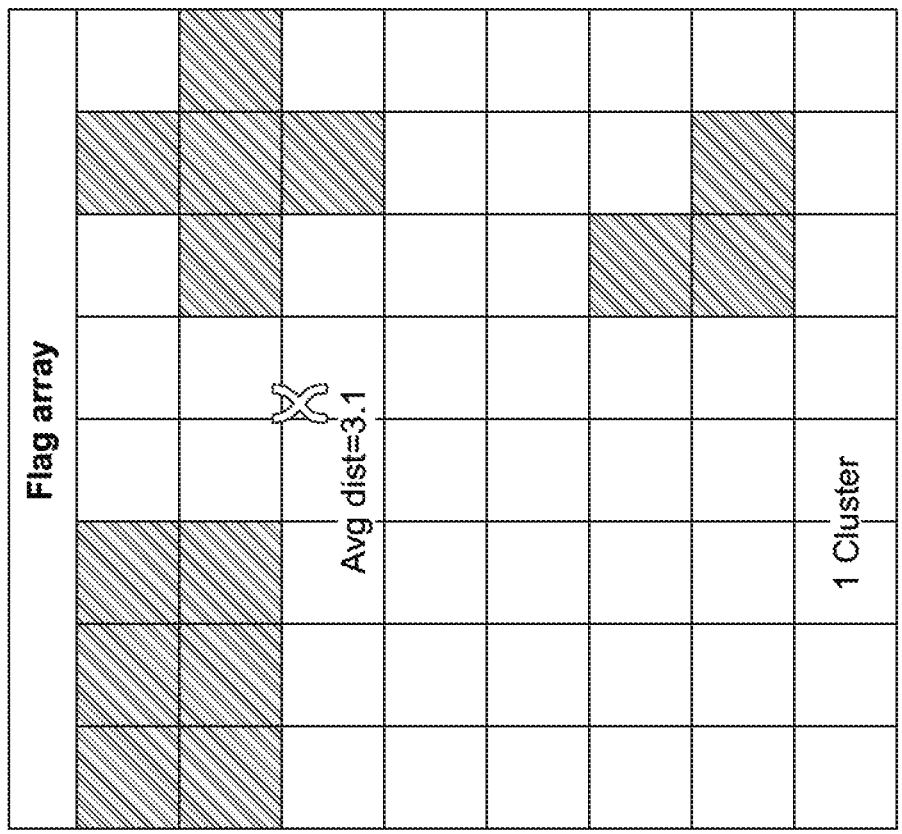
Figure 17C:
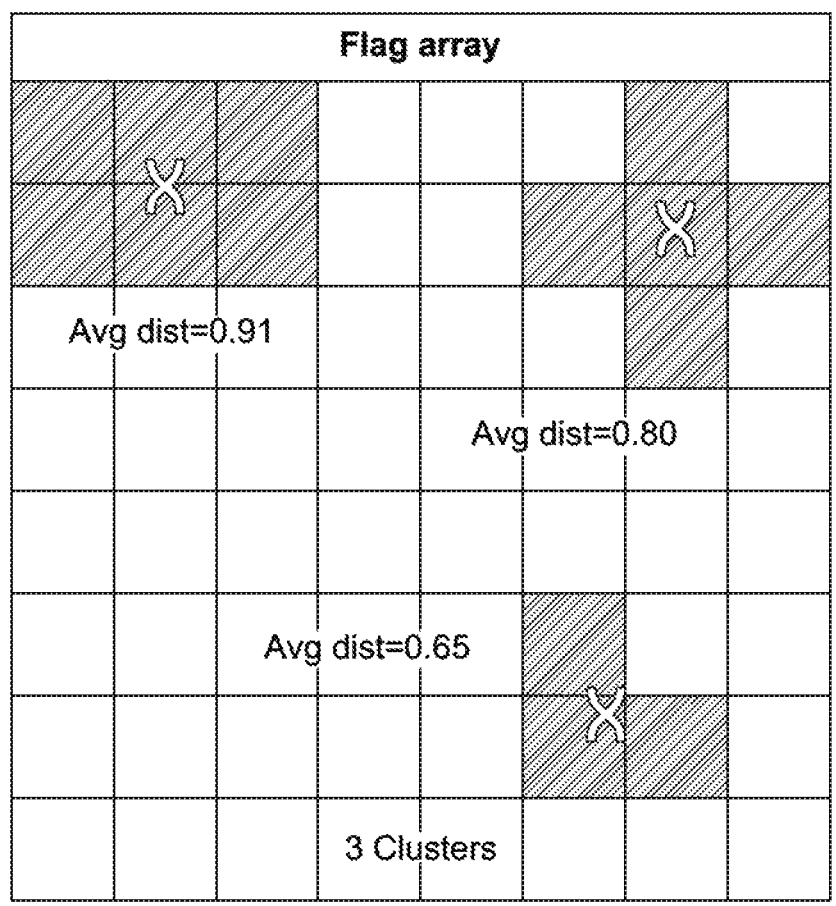

In another example, depicted in FIGS. 16-17, shown is a situation where there are three people under the thermopile grid array. Even if the shapes of the clustered pixels in FIGS. 16A-16C are not all the same with each other, it is still possible to determine from the centroid analysis herein, as represented in FIGS. 17A-17C, that different shapes can correspond to individual people. In this example, it is noted that an array might have several clustered hotspots. In a first step (FIG. 17A), a single centroid is introduced into the array and distances from the flagged pixels to the centroid are calculated (average distance=3.1 pixels). If an average distance from the flagged pixels to the centroid is too large to be meaningful, then a second centroid is added. If one of the distances, in the situation where the second centroid had been added (FIG. 17B), can be physically meaningful and correspond to a person (average distance=0.65 pixels), but the other distance is too large to correspond to a person (average distance=2.6 pixels), then a third centroid is added (FIG. 17C). If after adding the third centroid, it is found that the average distances from the flagged pixels to the closest centroid are physically meaningful (average distances=0.91, 0.80, and 0.65 pixels), then the people count determination process will no longer add any further centroids, and the process will come to the conclusion that there are three people underneath the grid array. The determination of the location of the first centroid is determined from the average of the flagged pixels. As each pixel is being flagged, its coordinates in X, Y space may also be collected. The coordinates can be used to determine the distances from centroids. If an average position of each one of the flagged pixels is taken, that information can be used to determine the location of the first centroid. When attempting to add a second centroid, the process involves taking the pixel that is furthest away from the first centroid, and iteratively adjusting the position of the centroids based on the flagged pixels that are closest to that centroid.

Figure 18:
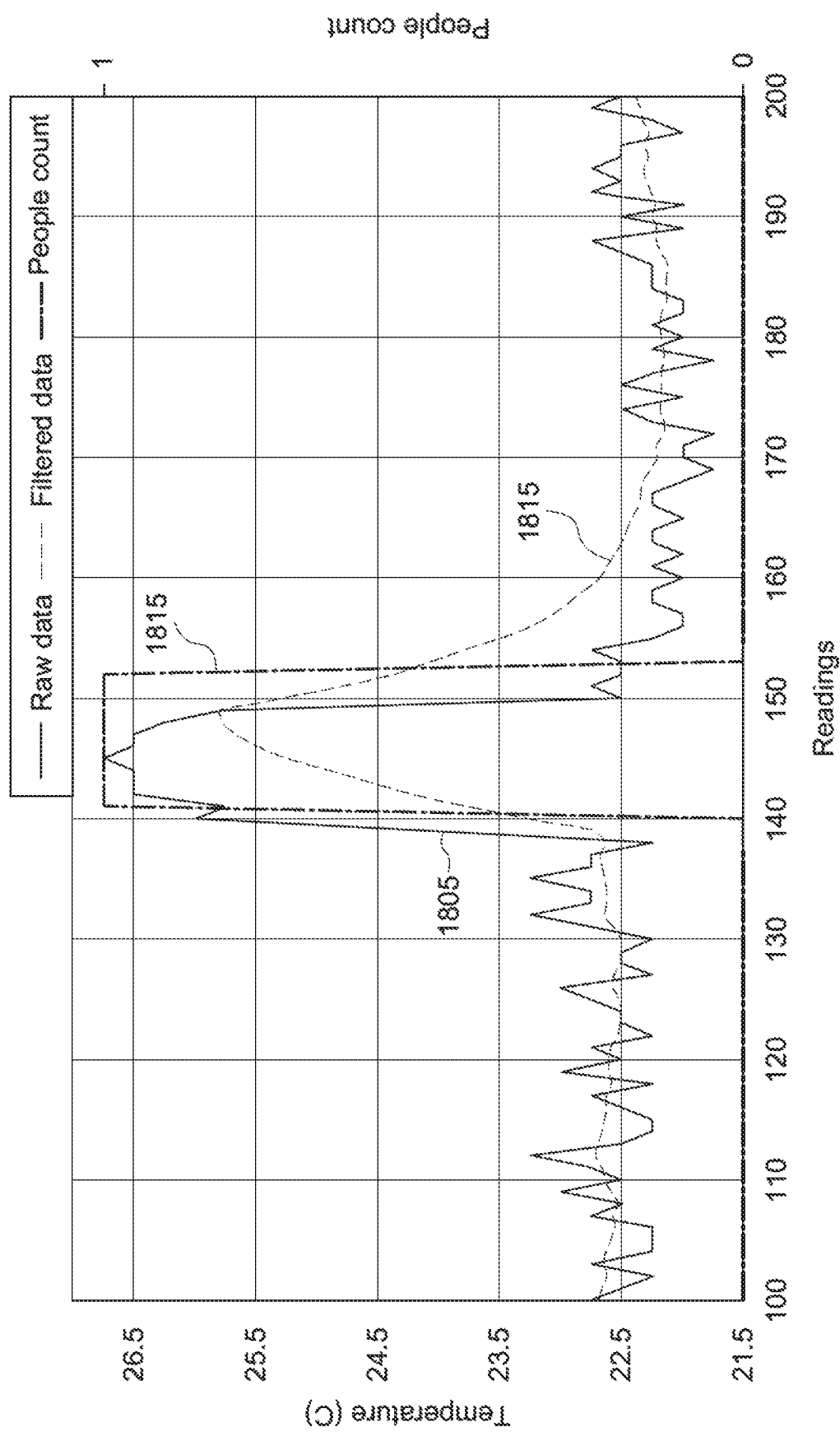
FIG. 18 is an illustrative graph, in accordance with some embodiments.

FIG. 18 depicts a delay, for one embodiment, between the point in time when a person walks into the space monitored by the sensor array and the point in time when such person is detected as being an occupant of that space. As can be seen, the raw data signal 1805 from one representative pixel shows a dramatic increase in temperature when the person first walks in around reading 138, while the filtered data values 1810 experiences a slight delay in its own temperature increase. As a result, there is a slight offset of about 3 readings from when the person is actually present and the reported people count 1815, for one embodiment. This delay may be adjusted through the noise filtering process, and the corresponding time delay may be adjusted through the data sampling frequency.

In some embodiments, an application may require a fast response time, such as triggering lights to turn on when a person first walks into a space. In this case, the raw data signal may be used to detect initial occupancy of the space, while the filtered data may be used to count the number of people. Sharp increases in the raw data signal, relative to the filtered data, may be indicative of a person walking through the field of view, and the difference in the raw data value and filtered data value at a given time may be used to determine occupancy when surpassing a set temperature threshold, that may be adjusted based on the installation environment variable (e.g., sensor mounting height, sensor field of view).

Some embodiments of the present disclosure are directed to a system that might not depend on the detection of motion in the room or space to be monitored. That is, the sensor array may generally be able to accurately count the number of people in the room, notwithstanding the reality of or need to determine whether people in the room are in motion. In a similar sense, some embodiments of the present disclosure are directed to a system that might use the detection of motion to trigger an occupied state initially, but not depend on motion for sensing a continued state of occupancy when people are in the room. In this case, the raw data signal may be used to detect initial occupancy, while the filtered data may be used to detect ongoing occupancy from the presence of heat, as opposed to motion. This embodiment may produce a "presence" sensing solution with far greater accuracy than traditional occupancy sensors (e.g., passive infra-red) that rely on motion for detection.

One or more of the computational steps disclosed herein (e.g., noise filtering and computation of the location and distances of centroids) may be executed by a system having one or more processors that are local to the sensor array, at a remote server accessed through a communications network, computed in the cloud, and a combination thereof.

Figure 19:
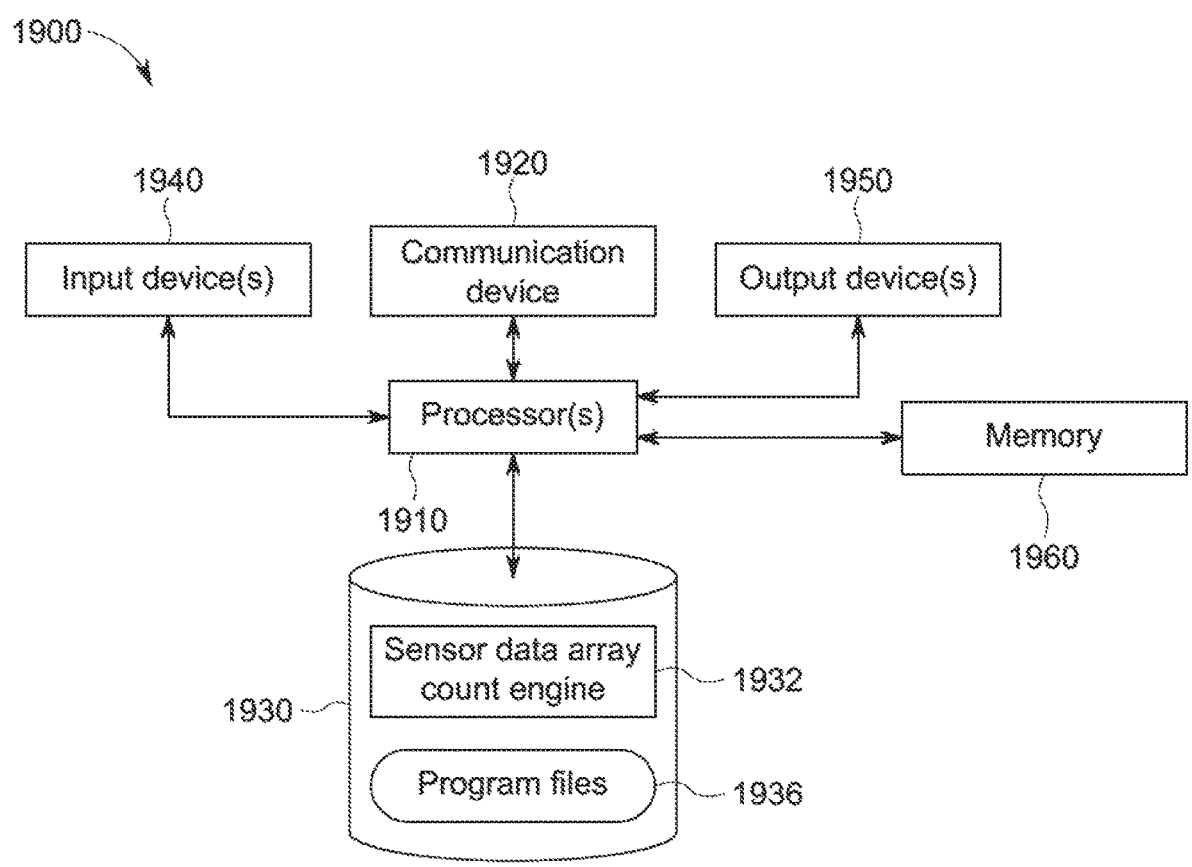
FIG. 19 is an illustrative depiction of a system in accordance with some embodiments.

FIG. 19 is a block diagram of computing system 1900 according to some embodiments. System 1900 may comprise a general-purpose or special-purpose computing apparatus and may execute program code to perform any of the methods, operations, and functions described herein. System 1900 may comprise an implementation of one or more systems and processes. System 1900 may include other elements that are not shown, according to some embodiments.

System 1900 includes processor(s) 1910 operatively coupled to communication device 1920, data storage device 1930, one or more input devices 1940, one or more output devices 1950, and memory 1960. Communication device 1920 may facilitate communication with external devices, such as a data server and other data sources. Input device(s) 1940 may comprise, for example, a keyboard, a keypad, a mouse or other pointing device, a microphone, knob or a switch, an infra-red (IR) port, a docking station, and/or a touch screen. Input device(s) 1940 may be used, for example, to enter information into system 1900. Output device(s) 1950 may comprise, for example, a display (e.g., a display screen) a speaker, and/or a printer.

Data storage device 1930 may comprise any appropriate persistent storage device, including combinations of magnetic storage devices (e.g., magnetic tape, hard disk drives and flash memory), optical storage devices, Read Only Memory (ROM) devices, etc., while memory 1960 may comprise Random Access Memory (RAM), Storage Class Memory (SCM) or any other fast-access memory. Files including, for example, sensor array specifications, output records of processes (e.g., processes shown in FIGS. 3, 9, and 13 and/or portions thereof) herein, and other data structures may be stored in data storage device 1930.

Sensor Data Array Count Engine 1932 may comprise program code executed by processor(s) 1910 (and within the execution engine) to cause system 1900 to perform any one or more of the processes described herein. Embodiments are not limited to execution by a single apparatus. Data storage device 1930 may also store data and other program code 1936 for providing additional functionality and/or which are necessary for operation of system 1900, such as device drivers, operating system files, etc.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods disclosed herein, such as a method of determining a design a part and a combination of a thermal support structure and a structural support structure.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

What is claimed is:

1. A method comprising:
receiving, by a processor from a plurality of sensors, a sequence of data indicative of a presence of a person in an area of interest within a field of view of the plurality of sensors;
determining, by the processor based on data received from the plurality of sensors, an estimate of background level information for the area of interest in an instance of an absence of a person in the area of interest;
generating, by the processor, one or more probabilities of a person being located in the area of interest based on a combination of the determined background level information for the area of interest and the sequence of data indicative of a presence of a person in the area of interest;

determining, by the processor, a number of centroids in the area of interest based on an execution of a clustering process applied to the generated one or more probabilities, the clustering process executed to determine an optimized total number of centroids for a dataset; and transmitting, by the processor, a count of persons in the area of interest based on the determined total number of centroids that are indicative of a person.

2. The method of claim 1, wherein the sequence of data includes ambient level data for the area of interest and current level data for each of the plurality of sensors.

3. The method of claim 1, wherein the plurality of sensors comprises an array of sensors.

4. The method of claim 3, wherein the array of sensors are integrated together in a common sensor device.

5. The method of claim 1, wherein the plurality of sensors detect at least one of a thermal energy emission and an electromagnetic emission.

6. The method of claim 1, wherein the determining of the estimate of the background level information for the area of interest in the instance of an absence of a person in the area of interest comprises determining level information for each of the plurality of sensors, for a plurality of iterations.

7. The method of claim 1, further comprising applying a noise-reducing filter to the received sequence of data indicative of a presence of a person in the area of interest and using the filtered sequence of data in the generating of the probability of a person being located in the area of interest.

8. The method of claim 1, wherein the clustering process executed to determine the optimized total number of centroids for a dataset includes a k-means clustering process.

9. The method of claim 7, further comprising determining an initial occupancy of a person in the area of interest based on the received sequence of data indicative of a presence, wherein an increase in a value of the received sequence of data relative to a value of the filtered sequence of data greater than a predetermined threshold value is indicative of the initial occupancy of a person in the area of interest.

10. The method of claim 9, wherein the threshold value is varied based on at least one installation environment variable.

11. The method of claim 7, further comprising determining an initial occupancy of a person in the area of interest based on the received sequence of data indicative of a presence, wherein the plurality of sensors detect a thermal energy emission and the filtered sequence of data includes data representative of the detected thermal energy emissions that is used to determine an on-going occupancy of a person in the area of interest.

12. A method comprising:
receiving, by a processor from a plurality of sensors, a sequence of data indicative of a presence of a person in an area of interest within a field of view of the plurality of sensors;
determining, by the processor, an estimate of background level information for the area of interest in an instance of an absence of a person in the area of interest;
applying a noise-reducing filter to the received sequence of data indicative of a presence of a person in the area of interest;
generating, by the processor, one or more probabilities of a person being located in the area of interest based on a combination of the determined background level information and the filtered sequence of data; and
determining an initial occupancy of a person in the area of interest based on the received sequence of data indicative of a presence, wherein the plurality of sensors detect a thermal energy emission and the filtered sequence of data includes data representative of the detected thermal energy emissions that is used to determine an on-going occupancy of a person in the area of interest.

13. A system comprising
a memory storing processor-executable instructions; and
one or more processors to execute the processor-executable instructions to:
receive, from a plurality of sensors, a sequence of data indicative of a presence of a person in an area of interest within a field of view of the plurality of sensors;
determine an estimate of background level information for the area of interest in an instance of an absence of a person in the area of interest;
generate one or more probabilities of a person being located in the area of interest based on a combination of the determined background level information and the sequence of data indicative of a presence of a person in the area of interest;
determine a number of centroids in the area of interest based on an execution of a clustering process applied to the generated one or more probabilities, the clustering process executed to determine an optimized total number of centroids for a dataset; and
transmit a count of persons in the area of interest based on the determined total number of centroids that are indicative of a person.

14. The system of claim 13, wherein the sequence of data includes ambient level data for the area of interest and current level data for each of the plurality of sensors.

15. The system of claim 13, wherein the determining of the estimate of the background level information for the area of interest in the instance of an absence of a person in the area of interest comprises determining level information for each of the plurality of sensors, for a plurality of iterations.

16. The system of claim 13, further comprising applying a noise-reducing filter to the received sequence of data indicative of a presence of a person in the area of interest and using the filtered sequence of data in the generating of the probability of a person being located in the area of interest.

17. The system of claim 16, further comprising determining an initial occupancy of a person in the area of interest based on the received sequence of data indicative of a presence, wherein an increase in a value of the received sequence of data relative to a value of the filtered sequence of data greater than a predetermined threshold value is indicative of the initial occupancy of a person in the area of interest.

18. The system of claim 17, wherein the threshold value is varied based on at least one installation environment variable.

19. The system of claim 16, further comprising determining an initial occupancy of a person in the area of interest based on the received sequence of data indicative of a presence, wherein the plurality of sensors detect a thermal energy emission and the filtered sequence of data includes data representative of the detected thermal energy emissions that is used to determine an on-going occupancy of a person in the area of interest.

20. A system comprising:
a memory storing processor-executable instructions; and
one or more processors to execute the processor-executable instructions to:

receive, processor from a plurality of sensors, a sequence of data indicative of a presence of a person in an area of interest within a field of view of the plurality of sensors;

determine an estimate of background level information for the area of interest in an instance of an absence of a person in the area of interest;

apply a noise-reducing filter to the received sequence of data indicative of a presence of a person in the area of interest;

generate a probability of a person being located in the area of interest based on a combination of the determined background level information and the filtered sequence of data;

apply a noise-reducing filter to the received sequence of data indicative of a presence of a person in the area of interest and using the filtered sequence of data in the generating of the probability of a person being located in the area of interest; and determine an initial occupancy of a person in the area of interest based on the received sequence of data indicative of a presence, wherein the plurality of sensors detect a thermal energy emission and the filtered sequence of data includes data representative of the detected thermal energy emissions that is used to determine an on-going occupancy of a person in the area of interest.

* * * * *